(12) United States Patent
Alonzo et al.

(10) Patent No.: US 12,115,769 B2
(45) Date of Patent: Oct. 15, 2024

(54) DEADFRONT ARTICLES WITH MULTI-LAYER OPTICAL STRUCTURES AND ASSOCIATED METHODS

(71) Applicant: CORNING INCORPORATED, Corning, NY (US)

(72) Inventors: Carlos Francis Alonzo, Corning, NY (US); Byung Yun Joo, Piscataway, NJ (US); James Frank Lamacchia, Hornell, NY (US); Soeren Thomas Lichtenberg, Wiesbaden (DE); Xu Ouyang, Painted Post, NY (US); Yawei Sun, Elmira, NY (US); James Andrew West, Painted Post, NY (US)

(73) Assignee: CORNING INCORPORATED, Corning, NY (US)

( * ) Notice: Subject to any disclaimer, the term of this patent is extended or adjusted under 35 U.S.C. 154(b) by 0 days.

(21) Appl. No.: 18/428,610

(22) Filed: Jan. 31, 2024

(65) Prior Publication Data
US 2024/0165919 A1 May 23, 2024

Related U.S. Application Data

(63) Continuation of application No. PCT/US2023/033693, filed on Sep. 26, 2023.
(Continued)

(51) Int. Cl.
*B32B 7/023* (2019.01)
*B60K 37/20* (2024.01)
(Continued)

(52) U.S. Cl.
CPC .............. *B32B 7/023* (2019.01); *B60K 37/20* (2024.01); *B32B 2307/4023* (2013.01);
(Continued)

(58) Field of Classification Search
CPC ............ B32B 7/023; B32B 2307/4023; B32B 2457/20; B60K 37/20; B60K 2360/20; B60K 35/22; G02F 1/157
(Continued)

(56) References Cited

U.S. PATENT DOCUMENTS 7,793,448 B1   9/2010   Huang et al.
7,810,266 B2   10/2010  Arnthorsson
(Continued)

FOREIGN PATENT DOCUMENTS

BE   420700 A      3/1937
EP   2385630 A2    11/2011
(Continued)

OTHER PUBLICATIONS

"Woodoo augmented wood", 2024, 14 pages.
(Continued)

*Primary Examiner* — William Choi
(74) *Attorney, Agent, or Firm* — William M. Johnson

(57) ABSTRACT

Described herein are deadfront assemblies that are configured to exhibit variable transmission and reflection performance attributes. The deadfront assemblies described herein comprise a first ink layer, an intermediate layer, and a second ink layer. The intermediate layer is disposed between the first and second ink layers and is configured to reflect light that is transmitted through the first ink layer back through the first ink layer so that one or more colors of the ink in the first ink layer is visible in the reflected light. The second ink layer is configured to counteract deviations in optical transmission caused by the first ink layer so that light transmitted through the deadfront assembly is not perceptively altered in color. Overlapping regions of the first and second ink layers comprise inverse appearance attributes so that light output
(Continued)

from a light source and transmitted through the deadfront assembly has a desired appearance.

20 Claims, 9 Drawing Sheets

Related U.S. Application Data

(60) Provisional application No. 63/411,963, filed on Sep. 30, 2022.

(51) Int. Cl.
*B60K 35/22* (2024.01)
*G02F 1/157* (2006.01)

(52) U.S. Cl.
CPC ........... *B32B 2457/20* (2013.01); *B60K 35/22* (2024.01); *B60K 2360/20* (2024.01); *G02F 1/157* (2013.01)

(58) Field of Classification Search
USPC .......................................................... 428/98
See application file for complete search history.

(56) References Cited

U.S. PATENT DOCUMENTS

| | | | |
|---|---|---|---|
| 9,945,539 | B1 | 4/2018 | Su et al. |
| 11,772,361 | B2 | 10/2023 | Hawtof et al. |
| 2010/0186214 | A1 | 7/2010 | Judge |
| 2016/0252656 | A1 | 9/2016 | Waldschmidt et al. |
| 2017/0009959 | A1 | 1/2017 | Shida |
| 2017/0115518 | A1* | 4/2017 | Shin ................... G02F 1/13394 |
| 2017/0361211 | A1 | 12/2017 | Gaynor et al. |
| 2018/0210118 | A1 | 7/2018 | Gollier et al. |
| 2019/0012033 | A1 | 1/2019 | Brandao Salgado et al. |
| 2019/0271884 | A1 | 9/2019 | Watanabe et al. |
| 2019/0315648 | A1 | 10/2019 | Kumar et al. |
| 2019/0329531 | A1 | 10/2019 | Brennan et al. |
| 2019/0360645 | A1 | 11/2019 | Chien et al. |
| 2020/0198535 | A1 | 6/2020 | Kontani |
| 2020/0207207 | A1 | 7/2020 | Lesuffleur et al. |
| 2021/0284063 | A1 | 9/2021 | Wang |
| 2021/0300265 | A1 | 9/2021 | Piccin |
| 2021/0311348 | A1 | 10/2021 | Fenton et al. |

FOREIGN PATENT DOCUMENTS

| | | |
|---|---|---|
| GB | 2281542 A | 3/1995 |
| GB | 2450090 A | 12/2008 |
| WO | 2019/055469 A1 | 3/2019 |
| WO | 2020/014064 A1 | 1/2020 |
| WO | 2020/219809 A1 | 10/2020 |

OTHER PUBLICATIONS

Baethis et al., "ShyTech Displays: High resolution Displays Hidden Behind Decorative Surfaces", SID 2022 Digest, 61-2 , pp. 798-801 (2022).
Continental Automotive; "invisible companion—Shy-tech display combines exciting design, functionality and safety"; (2021) 3 pages.
Gilbert et al., "Experiments on subtractive color mixing with a spectrophotometer" Am. J. of Phys. 75 (4) 313 (2007).
M. Ishiguro et al., "Brilliant cosmetic film for ambient displays with cholesteric liquid crystal" J Soc Info Display 26, pp. 208-213 (2018).
Paolo Falcaro et al., "Hierarchical Porous Silica Films with Ultralow Refractive Index", Chem. Mater. 2009, 21, 10, pp. 2055-2061.
Wild; "Transparent Wood: the Building Material of the Future?"; European Commission, (2019) 9 Pages, Retrieved from: https://ec.europa.eu/research-and-innovation/en/horizon-magazine/transparent-wood-building-material-future.
International Search Report and Written Opinion of the International Searching Authority; PCT/US2023/033693; dated Mar. 20, 2024; 12 pages; European Patent Office.

* cited by examiner

640

644

646

648

DEADFRONT ARTICLES WITH MULTI-LAYER OPTICAL STRUCTURES AND ASSOCIATED METHODS

CROSS-REFERENCE TO RELATED APPLICATIONS

This application is a continuation of International Patent Application No. PCT/US2023/033693, filed on Sep. 26, 2023, which claims the benefit of priority under 35 U.S.C. § 119 of U.S. Provisional Application Ser. No. 63/411,963, filed on Sep. 30, 2022, the contents of each of which is relied upon and incorporated herein by reference in its entirety.

FIELD

The disclosure relates to display articles comprising deadfront assemblies with improved color distortion performance and methods of pertaining to the same.

BACKGROUND

In various applications involving displays, it is desirable to have a display surface or functional surface having a deadfront appearance, where there is a seamless transition between display and non-display areas. Deadfronting techniques may be used, for example, to hide the edges of a display panel or the like when the article is viewed from a cover surface (e.g., of a plastic or glass display cover material). It is desirable from an aesthetic or design standpoint to have a deadfronted appearance such that, when the display is off, the display and non-display areas present as indistinguishable from one other and the cover surface presents a unified appearance. Applications where a deadfront appearance is desirable include automotive interiors, including in-vehicle displays or touch interfaces, as well as other applications in consumer mobile or home electronics, including mobile devices and home appliances.

Existing deadfronting techniques typically involve the application of films or layers that lower the overall optical transmission of the entire assembly (e.g., including the display panel and cover material). It is possible, through application of such existing films or layers, to provide articles with sufficiently low optical transmission to hide various components of the assembly while also providing a unified appearance by blending a pattern exhibited by the article with surrounding materials (e.g., the article may be patterned to exhibit a woodgrain or fabric pattern in reflection). However, certain existing assemblies may fail to provide a desired appearance in reflection without adversely impacting optical transmission performance of the article to a significant extent. For example, certain existing deadfront assemblies can alter the appearance of images rendered by the display panel due to the manner in which the layers absorb the light emitted by the display panel. Various portions of the layers may absorb the light emitted by the display differently, leading to color distortion in the displayed image.

Accordingly, an alternative deadfronting approach that provides a uniform or deadfronted appearance in reflection with improved color distortion performance in transmission is desired.

SUMMARY

An aspect (1) of the present disclosure present disclosure pertains to a deadfront article comprising: a substrate comprising a first major surface and a second major surface opposite the first major surface; and a deadfront assembly disposed on the second major surface, the deadfront assembly comprising: a first ink layer disposed proximate the second major surface; an intermediate layer positioned such that the first ink layer is disposed between the intermediate layer and the second major surface; and a second ink layer positioned such that the intermediate layer is disposed between the second ink layer and the first ink layer, wherein: the intermediate layer exhibits an average reflectance of greater than or equal to 1.0% over a wavelength range from 400 nm to 700 nm for light initially incident on a surface of the intermediate layer most proximate to the substrate, and the first ink layer comprises a first plurality of regions, the second ink layer comprises a second plurality of regions, each region of the second plurality of regions is configured to suppress deviations of an appearance of an overlapping region of the first plurality of regions from a target optical appearance in transmission.

An aspect (2) of the present disclosure pertains to a deadfront article according to the aspect (1), wherein each region of the second plurality of regions comprises tristimulus X, Y and Z values in accordance with the CIE 1931 color space that are computed as a ratio of target values to tristimulus X, Y and Z values of the overlapping region of the first plurality of regions, wherein the target values are each greater than or equal to 0.30 and less than or equal to 0.50.

An aspect (3) of the present disclosure pertains to a deadfront article according to the aspect (1), wherein, when light from a D65 illuminant is transmitted through the deadfront article, the light exhibits a maximum L* value that is greater than or equal to 50 and less than or equal to 80.

An aspect (4) of the present disclosure pertains to a deadfront article according to the aspect (3), wherein, when the light from the D65 illuminant is transmitted through the deadfront article, the light exhibits a maximum a* value that is greater than or equal to −5 and less than or equal to 5 and a maximum b* value that is greater than or equal to −5 and less than or equal to 5.

An aspect (5) of the present disclosure pertains to a deadfront article according to any of the aspects (3)-(4), wherein, when the light from the D65 illuminant is transmitted through the deadfront article, the light exhibits a maximum ΔE value, computed using the CIE76 formula and between two different positions on the deadfront article, that is less than or equal to 5.0.

An aspect (6) of the present disclosure pertains to a deadfront article according to the aspect (5), wherein the maximum ΔE value is less than or equal to 2.0.

An aspect (7) of the present disclosure pertains to a deadfront article according to any the aspects (1)-(6), wherein each overlapping pair of regions comprising one of the first plurality of regions and one of the second plurality of regions exhibits a tristimulus Y value that is greater than or equal to 0.3 and less than or equal to 0.5 when light from a light source is transmitted through the deadfront assembly.

An aspect (8) of the present disclosure pertains to a deadfront article according to any of the aspects (1)-(7), wherein the intermediate layer comprises a refractive index of greater than or equal to 1.8 or less than or equal to 1.2.

An aspect (9) of the present disclosure pertains to a deadfront article according to any of the aspects (1)-(8), wherein the intermediate layer comprises at least one of a transparent ink, a white ink or a gray ink.

An aspect (10) of the present disclosure pertains to a deadfront article according to any of the aspects (1)-(8), wherein the intermediate layer comprises a metallic layer.

An aspect (11) of the present disclosure pertains to a deadfront article according to any of the aspects (1)-(8), wherein: the intermediate layer comprises an air gap between the first ink layer and the second ink layer, and the second ink layer is disposed on a surface of a second substrate held in fixed relation to the substrate.

An aspect (12) of the present disclosure pertains to a deadfront article according to any of the aspects (1)-(8), wherein: the intermediate layer comprises an index of refraction of greater than or equal to 1.8 and comprises at least one of $Nb_2O_5$, $Nb_2O_5$, $Ta_2O_5$, $ZrO_2$, $HfO_2$, $Si_3N_4$, SiON, $Y_2O_3$, $TiO_2$, and a transparent conductive oxide, the first ink layer is disposed proximate to a first surface of the intermediate layer proximate the substrate, and the second ink layer is disposed directly on a second surface of the intermediate layer.

An aspect (13) of the present disclosure pertains to a deadfront article according to any of the aspects (1)-(8), wherein: the intermediate layer comprises a multilayer stack comprising alternating layers of one or more higher index materials and one or more lower index materials, the multilayer stack comprises from 2 to 20 of the alternating layers, the one or more lower index materials comprise a refractive index of less than 1.6 at 550 nm, and the one or more higher index materials comprise a refractive index of greater than 1.6 at 550 nm.

An aspect (14) of the present disclosure pertains to a deadfront article according to any of the aspects (1)-(8), wherein the intermediate layer comprises an electrochromic layer configured to change between a first optical transmission state and a second optical transmission state where an average transmittance of the intermediate layer over the wavelength range is less than in the first optical transmission state.

An aspect (15) of the present disclosure pertains to a deadfront article according to any of the aspects (1)-(7), wherein: the intermediate layer comprises a second substrate and a reflector layer disposed on a surface of a second substrate proximate to one of the first ink layer and the second ink layer, and the first ink layer is disposed on a first side of the second substrate proximate to the substrate, and the second ink layer is disposed on a second side of the second substrate.

An aspect (16) of the present disclosure pertains to a display assembly comprising: a substrate comprising a first major surface and a second major surface opposite the first major surface; and a deadfront assembly disposed on the second major surface, the deadfront assembly comprising: a first ink layer disposed proximate the second major surface; an intermediate layer positioned such that the first ink layer is disposed between the intermediate layer and the second major surface; and a second ink layer positioned such that the intermediate layer is deposed between the second ink layer and the first ink layer, and a light source coupled to the substrate such that the deadfront assembly is disposed between the light source and the substrate, wherein: the light source is configured to emit light having an illumination spectrum over a wavelength range from 400 nm to 700 nm that is initially incident on the second ink layer prior to being transmitted through the intermediate layer, first ink layer, and substrate, the intermediate layer exhibits an average reflectance of greater than or equal to 1.0% over the wavelength range for light initially incident on a surface of the intermediate layer most proximate to the substrate, the first ink layer comprises a first plurality of regions, the second ink layer comprises a second plurality of regions, each region of the second plurality of regions is configured to suppress deviations of an appearance of an overlapping region of the first plurality of regions from a target optical appearance such that, when the light source emits light at a white point of the light source, the deadfront article exhibits an L* value in transmission that is greater than or equal to 50 and less than or equal to 80, an a* value that is greater than or equal to −5.0 and less than or equal to 5.0, and a b*value that is greater than or equal to −5.0 and less than or equal to 5.0.

An aspect (17) of the present disclosure pertains to a display assembly according to the aspect (16), wherein the light source comprises a display laminated to the substrate, wherein the display comprises one of a liquid crystal display, an organic light emitting diode display, a µLED display, a quantum dot display, and a laser-based display.

An aspect (18) of the present disclosure pertains to a display assembly according to any of the aspect (16)-(17), wherein when the light source emits light at a white point of the light source, the deadfront article exhibits a first maximum ΔE value, computed using the CIE76 formula and between two different positions on the deadfront article, that is less than or equal to 5.0.

An aspect (19) of the present disclosure pertains to a display assembly according to the aspect (18), wherein the first maximum ΔE value is less than or equal to 2.0.

An aspect (20) of the present disclosure pertains to a display article according to the aspect (16), wherein when the light source emits light having a target L* value, a target a* value, and a target b* value that is transmitted through the deadfront article, the deadfront article exhibits a second maximum ΔE value, computed using the CIE76 formula and between the target L*, a*, and b* values and measured L*, a*, and b* values from light transmitted through the deadfront article, that is less than or equal to 5.0.

An aspect (21) of the present disclosure pertains to a display article according to the aspect (20), wherein the second maximum ΔE value is less than or equal to 2.0.

An aspect (22) of the present disclosure pertains to a display article according to any of the aspects (16)-(21), wherein the intermediate layer comprises a refractive index of greater than or equal to 1.8 or less than or equal to 1.2.

An aspect (23) of the present disclosure pertains to a display article according to any of the aspects (16)-(22), wherein the intermediate layer comprises at least one of a transparent ink, a white ink or a gray ink.

An aspect (24) of the present disclosure pertains to a display article according to any of the aspects (16)-(22), wherein the intermediate layer comprises a metallic layer.

An aspect (25) of the present disclosure pertains to a display article according to any of the aspects (16)-(22), wherein: the intermediate layer comprises an air gap between the first ink layer and the second ink layer, and the second ink layer is disposed on a surface of a second substrate held in fixed relation to the substrate.

An aspect (26) of the present disclosure pertains to a display article according to any of the aspects (16)-(22), wherein: the intermediate layer comprises an index of refraction of greater than or equal to 1.8 and comprises at least one of $Nb_2O_5$, $Nb_2O_5$, $Ta_2O_5$, $ZrO_2$, $HfO_2$, $Si_3N_4$, SiON, $Y_2O_3$, $TiO_2$, and a transparent conductive oxide, the first ink layer is disposed proximate to a first surface of the intermediate layer proximate the substrate, and the second ink layer is disposed directly on a second surface of the intermediate layer.

An aspect (27) of the present disclosure pertains to a display article according to any of the aspects (16)-(22), wherein: the intermediate layer comprises a multilayer stack comprising alternating layers of one or more higher index materials and one or more lower index materials, the multilayer stack comprises from 2 to 20 of the alternating layers, the one or more lower index materials comprise a refractive index of less than 1.6 at 550 nm, and the one or more higher index materials comprise a refractive index of greater than 1.6 at 550 nm.

An aspect (28) of the present disclosure pertains to a display article according to any of the aspects (16)-(22), wherein the intermediate layer comprises an electrochromic layer configured to change between a first optical transmission state and a second optical transmission state where an average transmittance of the intermediate layer over the wavelength range is less than in the first optical transmission state.

An aspect (29) of the present disclosure pertains to a display article according to any of the aspects (16)-(21), wherein: the intermediate layer comprises a second substrate and a reflector layer disposed on a surface of a second substrate proximate to one of the first ink layer and the second ink layer, the first ink layer is disposed on a first side of the second substrate proximate to the substrate, and the second ink layer is disposed on a second side of the second substrate.

An aspect (30) of the present disclosure pertains to a method of fabricating a display assembly comprising: determining a first pattern with a first plurality of regions for a first ink layer; determining a second pattern with a second plurality of regions for a second ink layer so that the second plurality of regions are configured to suppress deviations of an appearance of the first plurality of regions from a target appearance in transmission; and disposing the second ink layer and the first ink layer on a substrate such that an intermediate layer is disposed between the first ink layer and the second ink layer, the intermediate layer exhibiting an average reflectance of greater than or equal to 1.0% over a wavelength range from 400 nm to 700 nm for light initially incident on a surface of the intermediate layer most proximate to the substrate.

An aspect (31) of the present disclosure pertains to a method according to the aspect (30), wherein, determining the second pattern comprises: determining XYZ color coordinate values exhibited by each of the first plurality of regions when a light source is emitting light at a white point of the light source through the first ink layer; and computing ratios of target XYZ color coordinate values to the XYZ coordinate values to determine XYZ coordinate values for each of the second plurality of regions, wherein the XYZ coordinate values are greater than or equal to 0.3 and less than or equal to 0.5.

An aspect (32) of the present disclosure pertains to a method according to the aspect (30), further comprising attaching the substrate, the first ink layer, the intermediate layer, and the second ink layer to a light source so that the light source is configured to emit light having an illumination spectrum that is transmitted through the second ink layer, the intermediate layer, the first ink layer, and the substrate.

An aspect (33) of the present disclosure pertains to a method according to the aspect (32), wherein: the intermediate layer comprises an ink layer printed directly on the first ink layer, the second ink layer is printed directly on the intermediate layer, and attaching the substrate, the first ink layer, the intermediate layer, and the second ink layer to the light source comprises laminating the light source to the substrate.

An aspect (34) of the present disclosure pertains to a method according to the aspect (32), wherein: the intermediate layer comprises an air gap disposed between the first ink layer and the second ink layer, the second ink layer is printed on a second substrate held in spaced relation to the substrate, and attaching the substrate, the first ink layer, the intermediate layer, and the second ink layer to the light source comprises: laminating the second substrate to the light source, and attaching the light source and second substrate to the substrate so that the second ink layer is held in spaced relation to the substrate to create the air gap.

An aspect (35) of the present disclosure pertains to a method according to the aspect (32), wherein: the intermediate layer comprises a second substrate, the second ink layer is disposed on a surface of the second substrate, and attaching the substrate, the first ink layer, the intermediate layer, and the second ink layer to the light source comprises laminating the second substrate to the light source and laminating the light source to the substrate so that the second substrate is disposed between the substrate and the light source.

An aspect (36) of the present disclosure pertains to a method according to the aspect (35), wherein the second substrate comprises a refractive index of greater than or equal to 1.8 or less than or equal to 1.2 and the first and second ink layers are disposed directly on surfaces of the second substrate.

An aspect (37) of the present disclosure pertains to a method according to the aspect (35), wherein the second substrate comprises a refractive index that is greater than 1.2 and less than 1.8 and the intermediate layer further comprises a reflector layer disposed on a surface of the second substrate.

An aspect (38) of the present disclosure pertains to a method according to any of the aspects (32)-(27), wherein the determining the second pattern comprises: determining sets of first RGB values for the first plurality of regions based on the light emitted by the light source, computing sets of second RGB values for the second plurality of regions based on a set of target RGB values and the first RGB values, and converting the sets of second RGB values for each of the plurality of second regions to a combination of inks for each of the second plurality of regions using a subtractive color model.

It is to be understood that both the foregoing general description and the following detailed description are merely exemplary, and are intended to provide an overview or framework to understanding the nature and character of the claims. The accompanying drawings are comprised to provide a further understanding, and are incorporated in and constitute a part of this specification. The drawings illustrate one or more embodiment(s), and together with the description serve to explain principles and operation of the various embodiments.

BRIEF DESCRIPTION OF THE DRAWINGS

The accompanying drawings incorporated in and forming a part of the specification illustrate several aspects of the present invention and, together with the description, serve to explain the principles of the invention. In the drawings.

DETAILED DESCRIPTION

Figure 1:
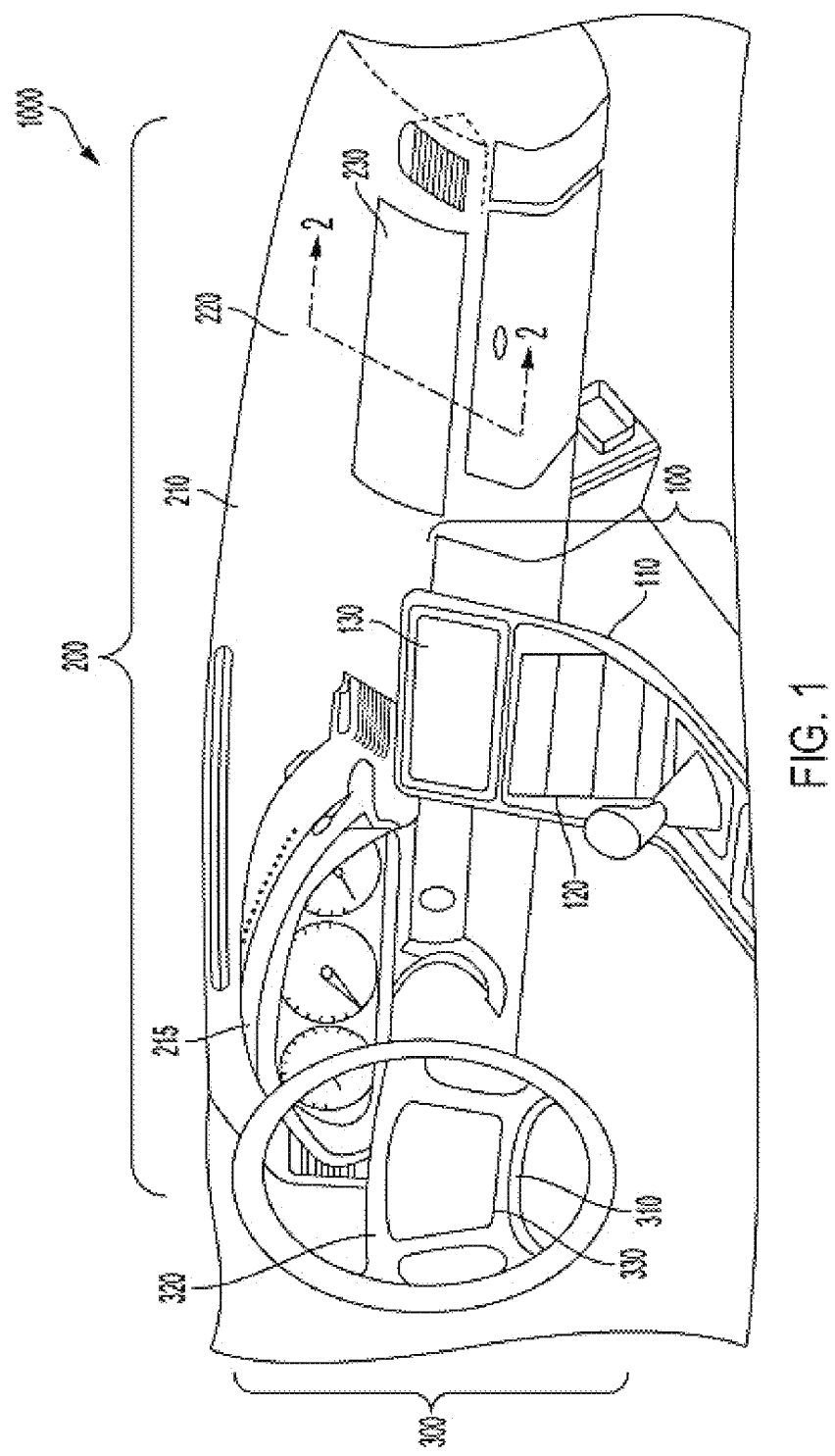
FIG. 1 is a perspective view of a vehicle interior with vehicle interior systems having displays, according to one or more embodiments of the present disclosure.

Referring generally to the figures, described herein are articles providing deadfronting for various applications. The articles comprise a substrate and a deadfront assembly disposed on a surface of the substrate. The deadfront assembly comprises a first ink layer that is configured to provide the article with a desired appearance in reflection from light that is initially incident on the substrate and reflected from the deadfront assembly. The first ink layer can comprise a printed image of a suitable pattern (e.g., a woodgrain, fabric, or any other suitable pattern) selected so that the article has a unified appearance with other objects surrounding the article. Despite providing a desired appearance in reflection, the printed image may not have a desired appearance (e.g., in terms of one or more of perceived color and transmission spectrum) in transmission from light initially incident on the deadfront assembly and transmitted through the substrate. Accordingly, the deadfront assembly further comprises a second ink layer and an intermediate layer disposed between the first ink layer and the second ink layer. The intermediate layer exhibits an average reflectance of at least 1% (e.g., at least 2%, at least 4%, at least 8%) over a wavelength range from 400 nm to 700 nm to facilitate visibility of the printed image in reflection. The second ink layer is constructed to suppress the deviations from the desired appearance of the first ink layer in transmission. In this regard, overlapping regions of the first and second ink layers are designed so that various portions of the article exhibit target optical transmission performance attributes. A particular region of the second ink layer is specifically constructed depending on the optical transmission characteristics of an overlapping region of the first ink layer to achieve the desired optical performance in transmission. Put differently, the second ink layer may form a pattern that is an inverse of that formed by the first ink layer, with the inverse being computed based on a desired optical transmission performance attribute (e.g., transmission spectra, phototropic transmission, perceived color in terms of XYZ coordinates) of a particular region of the article. As a result, an image emitted by a light source (e.g., a display panel) may be transmitted through the article with minimal color distortion, even when the first ink layer would tend to cause such color distortion of the image when in isolation (without the second ink layer). The second ink layer may prevent the first ink layer from changing the perceived color of various portions of the image transmitted through the article, despite the colored appearance of the first ink layer in reflection.

The deadfront articles described herein may find use in any application where it is desired to provide an article that deviates in appearance depending on whether the article is viewed in reflection and transmission. A particular application where such different appearances in reflection and transmission are desired is in automotive interior displays, where it is desired to provide displays that are concealed or blend in with surrounding objects (e.g., the center console, dashboard, seat backs) when the display is off, and to present clear images to users when the display is on. The first ink layer and intermediate layer described herein aid in providing the glass article a desired appearance in reflection (e.g., from ambient light), while the second ink layer suppresses the appearance of the first ink layer in images transmitted through the article. Effects in the perceived color of the image rendered by the display caused by the first ink layer can be suppressed or even eliminated by incorporating a second ink layer in accordance with the methods described herein. Moreover, the articles described herein may also provide an overall optical transmission (measured from the substrate and deadfront assembly in combination) that is suitably low (e.g., an average optical transmittance from 400 nm to 700 nm of less than or equal to 60%, less than or equal to 50%, less than or equal to 50%, less than or equal to 40%, less than or equal to 30%, less than or equal to 20%, but greater than or equal to 5% or greater than or equal to 10% to allow a suitable portion of an image emitted by the display to be transmitted) so that the deadfront assembly hides various components of the display (e.g., display boundaries, electrical connections) from view, thereby effectively concealing the display when not in operation.

As used herein, the terms "optical transmission," "percent transmission," and "transmittance" are used interchangeably and refer to a percentage of light transmitted through an article over a wavelength range of interest. An "average transmittance" for light in a particular wavelength range is determined by averaging a measured optical transmission at all of the whole number wavelengths within that wavelength range.

As used herein, the terms "optical reflectance," "percent reflectance," and "reflectance" are used interchangeably and refer to a percentage of light reflected from an article over a wavelength range of interest. When a reflectance of a particular surface is mentioned, the referred-to value only applies to a single surface of the glass article (e.g., of a surface of a variable transmittance component). An "average optical reflectance" for light in a particular wavelength range is determined by averaging a measured optical reflectance at all of the whole number wavelengths within that wavelength range.

FIG. 1 shows a vehicle interior 1000 that includes three different vehicle interior systems 100, 200, 300, according to an exemplary embodiment. Vehicle interior system 100 includes a center console base 110 with a curved surface 120 including a display 130. Vehicle interior system 200 includes a dashboard base 210 with a curved surface 220 including a display 230. The dashboard base 210 typically includes an instrument panel 215 which may also include a display. Vehicle interior system 300 includes a dashboard steering wheelbase 310 with a curved surface 320 and a display 330. In one or more embodiments, the vehicle interior system may include a base that is an arm rest, a pillar, a seat back, a floorboard, a headrest, a door panel, or any portion of the interior of a vehicle that includes a curved surface. In embodiments, the displays 130, 230, 330 are flat and comprise cover glass with planar major surfaces. In embodiments, one or more of the displays 130, 230, 330 are curved, and the curved display may include curved cover glass that may be hot-formed or cold-formed to possess such curvature. For example, such embodiments may incorporate the deadfront assemblies described herein disposed on cold-formed glass substrates (e.g., either prior to or after the glass is cold-formed). Such cold-forming may involve any of the techniques described in U.S. Pre-Grant Publication No. 2019/0329531 A1, entitled "Laminating thin strengthened glass to curved molded plastic surface for decorative and display cover application," U.S. Pre-Grant Publication No. 2019/0315648 A1, entitled "Cold-formed glass article and assembly process thereof," U.S. Pre-Grant Publication No. 2019/0012033 A1, entitled "Vehicle interior systems having a curved cover glass and a display or touch panel and methods for forming the same," and U.S. patent application Ser. No. 17/214,124, entitled "Curved glass constructions and methods for forming same," which are hereby incorporated by reference in their entireties.

The embodiments of the glass articles described herein can be used in any or all of vehicle interior systems 100, 200 and 300. While FIG. 1 shows an automobile interior, the various embodiments of the vehicle interior system may be incorporated into any type of vehicle such as trains, automobiles (e.g., cars, trucks, buses and the like), seacraft (boats, ships, submarines, and the like), and aircraft (e.g., drones, airplanes, jets, helicopters and the like), including both human-piloted vehicles, semi-autonomous vehicles and fully autonomous vehicles. Further, while the description herein relates primarily to the use of the glass articles in vehicle displays, it should be understood that various embodiments discussed herein may be used in any type of display application. The present disclosure is also not limited to display applications, but could be used in any deadfronting application.

Figure 2:
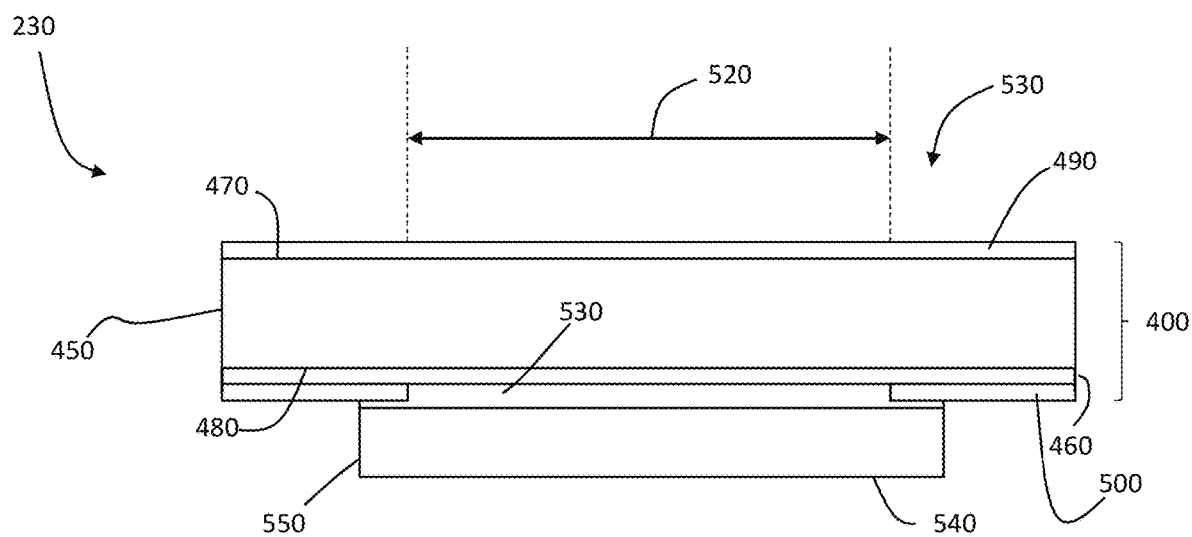
FIG. 2 schematically depicts a view of a display of a vehicle interior system through the line 2-2 depicted in FIG. 1, according to one or more embodiments of the present disclosure.

FIG. 2 schematically depicts a cross-sectional view of the display 230 through the line 2-2 of FIG. 1, according to an example embodiment where the display 230 is flat. While FIG. 2 depicts an example of the display 230, it should be understood that the displays 130, 330 described herein with respect to FIG. 1 may have similar cross-sectional structures and incorporate the deadfront assemblies described herein in a similar manner. The display 230 is shown to include a deadfront article 400 comprising a substrate 450 and a deadfront assembly 460 disposed on the substrate 450. While the display 230 is flat in the embodiment depicted in FIG. 2, embodiments are also envisioned where the display 230 is curved and the deadfront article 400 comprises one or more curved surfaces (e.g., as a result of being cold-formed or hot-formed to have a suitable curved shape).

As shown in FIG. 2, the deadfront article 400 comprises at least a substrate 450, a deadfront assembly 460, and optionally includes an opaque layer 500. The substrate 450 has a first major surface 470 facing a viewer and a second major surface 480 upon which the deadfront assembly 460 is disposed. In embodiments, the deadfront assembly 460 may be attached to the second major surface 480 using a suitable optically clear adhesive. In embodiments, at least a portion of the deadfront assembly 460 (e.g., the first ink layer 602 depicted in FIG. 3A) can be disposed (e.g., using an inkjet printer) directly onto the second major surface 480 of the substrate 450. As used herein, the term "dispose" includes coating, depositing and/or forming a material onto a surface using any known method in the art. The disposed material may constitute a layer, as defined herein. As used herein, the phrase "disposed on" includes the instance of forming a material onto a surface such that the material is in direct contact with the surface and also includes the instance where the material is formed on a surface, with one or more intervening material(s) is between the disposed material and the surface. The intervening material(s) may constitute a layer, as defined herein. The term "layer" may include a single layer or may include one or more sub-layers. Such sub-layers may be in direct contact with one another. The sub-layers may be formed from the same material or two or more different materials. In one or more alternative embodiments, such sub-layers may have intervening layers of different materials disposed therebetween. In one or more embodiments, a layer may include one or more contiguous and uninterrupted layers and/or one or more discontinuous and interrupted layers (i.e., a layer having different materials formed adjacent to one another). A layer or sub-layers may be formed by any known method in the art, including discrete deposition or continuous deposition processes. In one or more embodiments, the layer may be formed using only continuous deposition processes, or, alternatively, only discrete deposition processes.

In embodiments, the substrate 450 is a glass substrate that is optionally chemically strengthened and comprises a thickness of from 0.05 to 2.0 mm. Details of such glass substrates will be described herein with respect to FIG. 7. Although embodiments are preferred where the substrate 450 is a glass substrate, alternative embodiments may include a substrate constructed of an alternative material, such as a transparent plastic, such as PMMA, PMMA/PC, PMMA/PC/PMMA, polycarbonate and the like. As will also be discussed more fully below, in embodiments, when included, the opaque layer 500 is printed onto the second major surface 480 of the substrate 450. In embodiments, the opaque layer 500 is printed onto the deadfront assembly 460.

In embodiments, the deadfront article 400 comprises a functional surface layer 490. The functional surface layer 490 can be configured to provide one or more of a variety of functions. For example, the functional surface layer 490 may be optical coating configured to provide easy-to-clean performance, anti-glare properties, and/or antireflection properties. Such optical coatings can be created using single layers or multiple layers. In the case of antireflection functional surface layers, such layers may be formed using multiple layers having alternating high refractive index and low refractive index. Non-limiting examples of low refractive index films include $SiO_2$, $MgF_2$, and $Al_2O_3$, and non-limiting examples of high refractive index films include $Nb_2O_5$, $TiO_2$, $ZrO_2$, $HfO_2$, and $Y_2O_3$. In embodiments, the total thickness of such an optical coating (which may be disposed over an anti-glare surface or a smooth substrate surface) is from 5 nm to 750 nm. Additionally, in embodiments, the functional surface layer 490 that provides easy-to-clean performance also provides enhanced feel for touch screens and/or coating/treatments to reduce fingerprints. In some embodiments, functional surface layer 490 is integral to the first surface of the substrate. For example, such functional surface layers can include an etched surface in the first surface of the substrate 450 providing an anti-glare surface (or haze of from, e.g., 2% to 10%). In embodiments, both the first major surface 470 and the second major surface 480 of the deadfront article 400 comprise any of the functional layers described herein.

In embodiments, the opaque layer 500, when included, is constructed of a suitable ink (e.g., thermally curable ink, photocurable ink) and comprises a relatively high optical density, e.g., an optical density of greater than 3, greater than or equal to 4, greater than or equal to 5, in order to block light transmittance. In embodiments, the opaque layer 500 is used to block light from transmitting trough certain regions of the deadfront article 400. In embodiments, the opaque layer 500 obscures functional or non-decorative elements provided for the operation of the deadfront article 400. In embodiments, the opaque layer 500 is provided to outline backlit icons and/or other graphics (not depicted) so as to increase the contrast at the edges of such icons and/or graphics. The opaque layer 500 can be any color; in particular embodiments, though, the opaque layer 500 is black or gray. In embodiments, the opaque layer 500 is applied via inkjet printing, screen printing, coating, or other suitable technique over the deadfront assembly 460 and/or over the second major surface 480 of the substrate 450. Generally, the thickness of the opaque layer 500 is less than or equal to 25 µm (e.g., greater than or equal to 1.0 µm and less than or equal to 25.0 µm, greater than or equal to 5.0 µm and less than or equal to 25.0 µm, greater than or equal to 5.0 µm and less than or equal to 20.0 µm, greater than or equal to 5.0 µm and less than or equal to 10.0 µm).

In embodiments, the opaque layer 500, when included, may be directly deposited onto the second major surface 480 of the substrate 450 or deadfront assembly 460 using a suitable inkjet process. In embodiments, prior to deposition of the opaque layer 500, the second major surface 480 or deadfront assembly 460 may be primed using a suitable primer (e.g., an acryloxy silane primer) to facilitate adhesion of the opaque layer 500 to the substrate 450 or deadfront assembly 460. Any suitable treatment to the second major surface 480 may be used to facilitate adhesion of the opaque layer 500 to the substrate 450. As described herein, in embodiments, the deadfront article 400 does not include the opaque layer 500.

In embodiments, as shown in FIG. 2, the deadfront article 400 is placed over or in front of a light source 540. The light source 540 is generally configured to emit light that is transmitted through the substrate 450 for viewing from the first major surface 470. The light emitted by the light source 540 may be monochromatic or cover any suitable spectral range to generate a suitable image. The light emitted by the light source 540 may show the entire spectral range simultaneously or use field-sequential color in which narrower spectral bands are transmitted sequentially in time and matched with corresponding sequential display images. In one or more embodiments, the light source 540 comprises a display, such as a touch-enabled displays which include a display and touch panel. Exemplary displays include LED display, a quantum dot display, a laser display, a DLP MEMS chip, LCDs, OLEDs, transmissive displays, and the like. In embodiments, the light source 540 comprises another suitable light emission device (e.g., a light-emitting diode or light-emitting diode array, a laser, or other light source).

In embodiments, the high optical density of the opaque layer 500, when included, causes the areas of the deadfront article 400 incorporating the opaque layer 500 to have relatively low optical transmission (e.g., an average transmittance of less than or equal to 1.0%, less than or equal to 0.5%, or less than or equal to 0.1% in the visible spectrum). Accordingly, the boundaries of the opaque layer 500 may define an image region 520, where the deadfront article 400 can exhibit a relatively high optical transmission to facilitate visibility of the light generated by the light source 540 when the deadfront article 400 is viewed from the first major surface 470, and a peripheral region 530, where the deadfront article 400 generally exhibits a lower optical transmission than in the image region 520 to facilitate concealment of various components (e.g., electrical connections, mechanical housings, and the like).

In the depicted embodiment, the image region 520 is circumferentially surrounded by the peripheral region 530. For example, in embodiments, the peripheral region 530 forms a border of the image region 520 and completely surrounds the image region 520. The border may comprise a uniform width around an entirety of the image region 520. Alternative embodiments, where the peripheral region 530 does not completely surround the image region 520, are also contemplated and within the scope of the present disclosure. For example, in embodiments, the peripheral region 530 may be disposed adjacent to the image region 520 and only extend along a single side of the image region 520. The present disclosure is not limited to applications where the image region 520 of relatively high optical transmission is centrally disposed in the deadfront article 400.

In embodiments, the opaque layer 500 is omitted and the deadfront article 400 exhibits consistent optical properties (in terms of reflectance and transmittance) over an entirety of the surface area thereof. For example, in embodiments, the deadfront assembly 460 is configured such that the deadfront article 400 exhibits a uniform appearance when viewed from the first major surface 470 and the light source 540 is not emitting light. In embodiments, for example, the optical transmission of the deadfront article 400 may be low enough to hide the components of the light source 540 from view. In embodiments, the deadfront article 400 exhibits an average transmission over the wavelength range of 400 nm to 700 nm (when the light is normally incident on the substrate 450) of less than or equal to 60% (e.g., less than or equal to 50%, less than or equal to 50%, less than or equal to 40%, less than or equal to 30%, less than or equal to 20%, but greater than or equal to 5% or greater than or equal to 10%). As a result, the deadfront assembly 460 may prevent the light source 540 from being visible to viewers when the light source 540 is not emitting light, thereby providing the deadfront article 400 a favorable appearance.

Figure 3A:
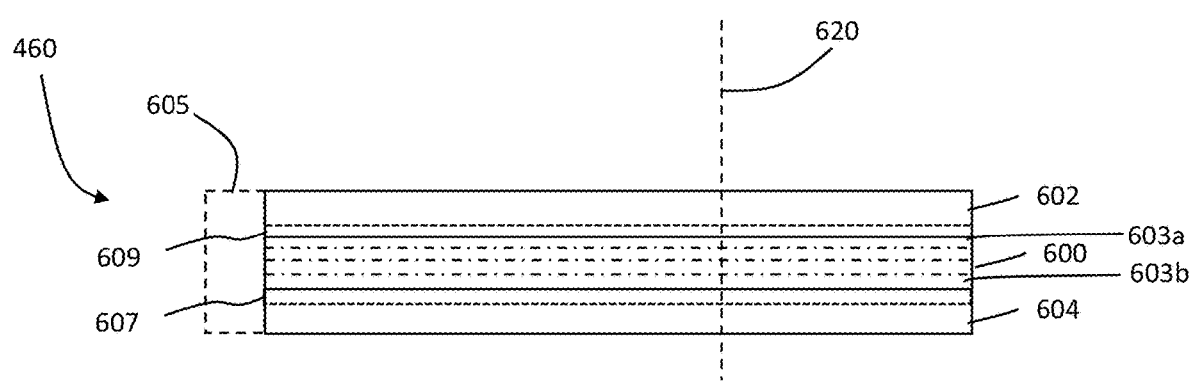
FIG. 3A schematically depicts a view of a deadfront assembly of the display depicted in FIGS. 1-2, according to one or more embodiments of the present disclosure.

FIG. 3A schematically depicts a cross-sectional view of the deadfront assembly 460 depicted in FIG. 2, according to an example embodiment. As shown, the deadfront assembly 460 comprises an intermediate layer 600, a first ink layer 602 disposed on a first side of the intermediate layer 600, and a second ink layer 604 disposed on a second side of the intermediate layer 600. The first ink layer 602 is disposed more proximate to the substrate 450 (see FIG. 2) than the intermediate layer 600 and the second ink layer 604. In embodiments, the first ink layer 602 is printed directly on the second major surface 480 of the substrate 450. In embodiments, the first ink layer 602 is printed on the intermediate layer 600 and the intermediate layer 600 is subsequently laminated onto the second major surface 480 such that a layer of a suitable optically transparent adhesive (not depicted) is disposed between the substrate 450 and the first ink layer 602.

The first ink layer 602 is generally configured to provide the deadfront article 400 with a desired appearance from light that is initially incident on the substrate 450, transmitted through the first ink layer 602, reflected via the intermediate layer 600, and transmitted back through the first ink layer 602 and substrate 450. The first ink layer 602 may determine an appearance of the deadfront article 400 in reflection from ambient light. In embodiments, the appearance of the deadfront article 400 in reflection is selected so that the deadfront article 400 blends in with other components surrounding the deadfront article 400 (see FIG. 2). For example, with reference to FIG. 1, the first ink layer 602 may be selected to form a pattern that matches that of the dashboard base 210 or other component surrounding the display 230 (e.g., an interior trim element). The pattern formed by the first ink layer 602 comprises one or more colors when light transmitted therethrough is perceived by a viewer from the side of the first major surface 470. In embodiments, the first ink layer 602 is integrated into the substrate 450 (e.g., the substrate 450 can comprise a semi-transparent substrate having a spatially varying optical transmission to create a pattern viewable therethrough). In such embodiments, the deadfront assembly 460 may lack the first ink layer 602 depicted in FIG. 3A.

In embodiments, the first ink layer 602 is printed onto the substrate 450 or the intermediate layer 600 using a subtractive color model, such as a CMY or a CMYK color model. In such embodiments, the first ink layer 602 generally comprises a printed image where a pattern of inks is printed onto the substrate 450 or the intermediate layer 600 using a suitable printing device (e.g., an inkjet printing device) in accordance with a pixel pattern. Each pixel may be associated with a region of the first ink layer 602 where a plurality of dots of CMY inks are combined to provide a desired color appearance for that region of the first ink layer 602. The ink used for printing the first ink layer 602 (and the second ink layer 604, as described herein) can be thermal or UV cured ink. In particular, the ink may be composed of at least one or more colorants and a vehicle. The colorants can be soluble or insoluble in the vehicle. In embodiments, the colorants are dry colorants in the form of a fine powder. Such fine powders have particles that are, in embodiments, from 10 nm to 500 nm in size. Using the CMYK color model, the colorant provides cyan, magenta, yellow, and/or key (black) colors. The colorants are dissolved or suspended in the vehicle. The vehicle can serve as a binder to create adhesion to the surface upon which the ink is applied. Further, in embodiments, additives are included in the vehicle specifically for the purpose of improving adhesion to glass/plastic surfaces. Non-limiting examples of vehicles for the colorant include propylene glycol monomethyl ether, diethylene glycol diethyl ether, dimethylacetamide, and toluene. Generally, such vehicles solidify at temperatures from 80° C. to 200° C. In embodiments, the ink includes from 0.5%-6% by volume of the colorant and 94%-99.5% by volume of the vehicle.

In embodiments, the pattern formed by the first ink layer 602 is selected based on the context in which the deadfront article 400 is being used. For example, in an automotive interior context, the pattern of colors in the first ink layer 602 can be one of wood-grain design, a leather-grain design, a fabric design, a brushed metal design, or other suitable design, so that, when the deadfront article 400 is viewed from the first major surface 470 and the light source 540 is not emitting light, the deadfront article 400 blends in with its surroundings. Accordingly, the particular combination of inks used at a particular location in the first ink layer 602 may vary depending on the application and context of the deadfront article 400. In embodiments, the first ink layer comprises a thickness that is greater than or equal to 1 μm and less than or equal to 6 μm to provide sufficient visibility of the color pattern without inhibiting optical transmission to such an extent to prevent the light from the light source 540 from being transmitted through the deadfront article in a sufficient amount. In embodiments, the optical density of the first ink layer is from 0.1 to 0.7 (e.g., from 0.1 to 0.5, from 0.3 to 0.5) so as to provide sufficient color visibility in reflection without overly obscuring the light source 540 so as to degrade display performance. The refractive index (at 550 nm) for the inks used to form the first ink layer 602 may be between 1.30 and 1.60 (e.g., greater than or equal to 1.45 and less than or equal to 1.55).

It is believed that little of the perceived color provided by the first ink layer 602 comes from light scattering within the ink itself. The inks used to form the first ink layer 602 are highly absorbing at certain wavelengths. Accordingly, the perceived color of the first ink layer 602 is caused by light passing through the first ink layer 602, being reflected, and again passing through the first ink layer 602. The intermediate layer 600 is configured to provide reflected light that is transmitted through the first ink layer 602 to render the pattern in the first ink layer 602 visible when ambient light is incident on the first major surface 470. The intermediate layer 600 exhibits an average reflectance of greater than or equal to 1.0% (preferable greater than or equal to 2.0%, more preferably greater than or equal to 3.0%, and even more preferably greater than or equal to 4.0%) over a wavelength range from 400 nm to 700 nm for light initially incident on a surface of the intermediate layer 600 most proximate to the substrate (at normal incidence). In embodiments, the average reflectance of the intermediate layer 600 is less than or equal to 10.0% (e.g., less than or equal to 9.0%, less than or equal to 8.0%, less than or equal to 7.0%). It has been found that such a reflectance provides adequate light to render the pattern in the first ink layer 602 visible without overly obscuring the light source 540.

A variety of constructions for the intermediate layer 600 are contemplated and within the scope of the present disclosure. In embodiments, the intermediate layer 600 comprises a single layer of material to provide reflections at interfaces with layers adjacent thereto (e.g., the first and second ink layers 602 and 604, optically transparent adhesives). In embodiments, the first and second ink layers 602 and 604 are formed of inks comprising refractive indices (at 550 nm) that are greater than or equal to 1.45 and less than or equal to 1.55. Based on modelling described herein, Applicant has determined that providing an intermediate layer 600 with a material having a refractive index (at 550 nm) that is greater than or equal to 1.7 or less than or equal to 1.3 (preferably greater than or equal to 1.8 and less than or equal to 1.2) provides a sufficient refractive index contrast to provide a suitable reflectance. Materials having a refractive index of greater than or equal to 1.7 can include high index glasses and metals or metallic oxides in either thin films or nanocomposite dispersions in lower-index resins. Suitable materials for such high index embodiments include, but are not limited to, $Nb_2O_5$, $Nb_2O_5$, $Ta_2O_5$, $ZrO_2$, $HfO_2$, $Si_3N_4$, SiON, $Y_2O_3$, $TiO_2$, and transparent conductive oxides (such as indium tin oxide). Materials having a refractive index of less than 1.2 include MgF or other suitable materials (e.g., material composites, meta-materials, porous materials, such as the silica-based porous materials disclosed in Paolo Falcaro et al., "Hierarchical Porous Silica Films with Ultralow Refractive Index", Chem. Mater. 2009, 21, 10, 2055-2061, hereby incorporated by reference in its entirety.)

When using such materials (having a refractive index that is greater than or equal to 1.7 or less than or equal to 1.3) for the intermediate layer 600, the thickness of the intermediate layer 600 should be thicker than 1 µm, which is greater than the coherence length of light from the external environment (e.g., sunlight) that may be incident on the intermediate layer 100. Layers thinner than 1 µm may exhibit interference effects that introduce angle and wavelength dependencies into reflection performance and degrade appearance. Such effects can be completely avoided when the intermediate layer 600 is greater than or equal to 5 µm in thickness. In such embodiments, the intermediate layer 600 comprises a thickness of greater than or equal to 5 µm and less than or equal to 5 mm (e.g., greater than or equal to 5 µm and less than or equal to 1.0 mm, greater than or equal to 5 µm and less than or equal to 500 µm, greater than or equal to 5 µm and less than or equal to 100 µm, greater than or equal to 5 µm and less than or equal to 50 µm, greater than or equal to 20 µm and less than or equal to 50 µm).

A suitable layer providing a refractive index (at 550 nm) of less than 1.2 is an air gap. That is, in embodiments, the intermediate layer 600 comprises an air gap disposed between the first ink layer 602 and the second ink layer 604. In embodiments, the air gap has a thickness that is in the ranges in the preceding paragraph to avoid interference effects. In such embodiments where the intermediate layer 600 comprises an air gap, the deadfront assembly 460 can include a support structure 605 configured to hold the first and second ink layers 602 and 604 in fixed relation relative to one another (e.g., so that the spacing between the first and second ink layers 602 and 604 is constant to aid in reducing wavefront tilting in the reflected light caused by the air gap). In embodiments, the support structure 605 is a frame that is attached to the substrate 450 (see FIG. 3). For example, the first ink layer 602 may be printed directly on the second major surface 480 (see FIG. 2) and the second ink layer 604 may be printed on a second substrate 607 that is inserted into the support structure 605. The support structure 605 may include one or more structural features (e.g., ledges, grooves) that aid in positioning the second substrate 607 having the second ink layer 604 printed thereon in a desired positioning relative to the first ink layer 602 such that an air gap is positioned between the first ink layer 602 and the second ink layer 604. The second substrate 607 may be a suitable transparent material (e.g., having an average transmittance greater than or equal to 80% or greater than or equal to 90%) such as a glass (e.g., soda lime, aluminosilicate, boroaluminosilicate) or polymeric material. Such a second substrate 607 may have a refractive index (at 550 nm) that is greater than or equal to 1.45 and less than or equal to 1.65 and comprise a thickness that is greater than or equal to 10 µm and less than or equal to 100 µm (e.g., greater than or equal to 10 µm and less than or equal to 75 µm, greater than or equal to 10 µm and less than or equal to 50 µm, greater than or equal to 20 µm and less than or equal to 40 µm). The second substrate 607 may be included in embodiments where the intermediate layer 600 does not include an air gap (e.g., at least one of the first and second ink layers 602 and 604 may be disposed on the second substrate 607, which may then be subsequently attached to the substrate 450). The second substrate 607 may also be omitted when the intermediate layer 600 is formed of a single layer having sufficient refractive index to eliminate the need for an additional reflector layer (in such embodiments, the second ink layer 604 may be disposed directly on this single layer).

In embodiments, the intermediate layer 600 comprises an additional layer of ink. The additional layer of ink may comprise a diffuse reflector such as a white ink or a grey ink. When a white ink is used, a colorant of a variety of suitable pigments, such as $TiO_2$, $Sb_2O_3$, $BaSO_4$, $BaSO_4$:ZnS, ZnO, and $(PbCO_3)_2$:$Pb(OH)_2$, disposed in a suitable vehicle can be used. Such white ink layers may have a whiteness of greater than or equal to 10 W and 60 W as measured according to ISO 11475:2004. Such a white ink layer may have a thickness of greater than or equal to 1 µm and less than or equal to 6.0 µm and comprise an optical density of 0.9 to 2.0. When a grey ink is used, the intermediate layer may be formed from an ink using a subtractive color model (e.g., CMY or CMYK). Such diffuse inks may be disadvantaged over the other alternatives described herein in that they may blur images emitted by the light source 540 and produce more sparkle. In embodiments, the additional ink layer may be a reflective (e.g., metallic) ink (e.g., including a high index colorant or additive of any of the high index materials described herein). In embodiments where an additional ink layer is used for the intermediate layer 600, each of the first ink layer 602, the second ink layer 604, and the intermediate layer 600 may be printed on the second major surface 480 in succession. Alternatively, one or more of the first ink layer 602, the intermediate layer 600, and the second ink layer 604 may be disposed on the second substrate 607, which may be subsequently attached to the substrate 450.

In embodiments, the intermediate layer 600 comprises an electrically responsive material that is configured to change between optical transmission states depending on an electrical signal provided thereto by a controller (not depicted). For example, the intermediate layer 600 may switch from a first transmission state with a higher transmission when the light source 540 is emitting light and a second transmission state with a lower transmission when the light source 540 is not emitting light. In such embodiments, the electrically responsive material may comprise an electrochromic layer, and the intermediate layer 600 may include electrodes, an electrolyte, and an ion-storage layer. The electrochromic layer comprises a suitable inorganic or organic (e.g., an electrochromic polymer) material. In embodiments, the electrochromic layer comprises a suitable oxide (e.g., $WO_3$, NiO, $WMoO_3$). The electrolyte may comprise a suitable material configured to transport protons supplied by the ion-storage layer. Any suitable existing electrochromic cell structure may be used. Any electrically responsive material described in U.S. Provisional Patent Application No.

63/406,335, filed on Sep. 14, 2022, hereby incorporated by reference in its entirety, may be used.

In embodiments, the intermediate layer 600 comprises a multilayer structure. In embodiments, the intermediate layer 600 comprises a layer of transparent material (e.g., the second substrate 607, formed a suitable glass or polymeric material). Such a transparent material may not have a sufficient refractive index contrast with adjacent layers to provide a suitable reflectance in isolation. Accordingly, the intermediate layer 600 may further include a reflector layer 609 disposed on the second substrate 607. The reflector layer 609 is configured to reflect light in the wavelength range of 400 nm to 700 nm in any of the suitable ranges described herein. The reflector layer 609 may be disposed adjacent to the first ink layer 602 or the second ink layer 604, or disposed on the second substrate 607 (in embodiments, the intermediate layer 600 consists of the second substrate 607 with the reflector layer 609 disposed thereon). In such embodiments, one of the first and second ink layers 602 and 604 may be disposed on the reflector layer 609 and the other of the first and second ink layers 602 may be disposed directly on the second substrate 607. Alternatively, the first ink layer 602 may be disposed on the second major surface 480 (see FIG. 2), the reflector layer 609 may be positioned adjacent the first ink layer 602 (or with a layer of optically transparent adhesive disposed therebetween), and the second ink layer 604 may be disposed on the second substrate 607. The reflector layer 609 may comprise a suitable layer of metallic material. In embodiments, the reflector layer 609 may be constructed so that the reflector layer 609 exhibits a sheet resistance of at least $10^5$ Ohms/sq to avoid inhibiting touch panel function. Suitable materials for the reflector material may include Ni, Cr, a Ni-containing alloy, and a Cr-containing alloy. Such reflector layers may have a thickness of less than 2 nm to provide a suitable sheet resistance and avoid inhibiting touch panel function. In embodiments, the reflector layer 609 comprises a multi-layer stack of materials of alternating high and low refractive index.

In embodiments, rather than being a monolithic layer of a single material (or a monolithic layer having the reflector layer 609 disposed thereon), the intermediate layer 600 comprises a multilayer stack. The multilayer stack can include one or more layers of higher index materials 603a and one or more layers of lower index materials 603b. In embodiments, the stack can include from 2 to 20 layers of alternating ones of the layers of the one or more higher index materials 603a and the one or more lower index materials 603b. The one or more layers of lower index materials 603b can have a refractive index of less than 1.6 at 550 nm. Some examples of suitable materials for use as the one or more lower index materials 603b include glasses, polymeric materials, $SiO_2$, $Al_2O_3$, $GeO_2$, $SiO$, $AlO_xN_y$, $SiO_xN_y$, $Si_uAl_vO_xN_y$, MgO, $MgAl_2O_4$, $MgF_2$, $BaF_2$, $CaF_2$, $DyF_3$, $YbF_3$, $YF_3$, $CeF_3$, or a Ni, Cr, NiCr, or Ti-doped nanocomposite. The one or more layers of higher index materials 603a can have a refractive index of greater than 1.6 at 550 nm. Suitable materials for use as the one or more higher refractive index materials 40 include, $Ta_2O_5$, $Nb_2O_5$, AlN, $Si_3N_4$, $AlO_xN_y$, $SiO_xN_y$, $HfO_2$, $TiO_2$, $ZrO_2$, $Y_2O_3$, $Al_2O_3$, $MoO_3$, indium tin oxide and diamond-like carbon. Such an alternating stack may aid in providing a relatively flat reflection band over the wavelength range of 400 nm to 750 nm and therefore have minimal effects on the perceived color of light transmitted through the deadfront article 400. Selection from such materials will also avoid shunting touch screen function behind the deadfront. Embodiments are also envisioned where such an alternating stack is included in addition to the reflector layer 607 in order to tune the reflection spectra and further prevent the reflector layer 607 from being oxidized when the first and second ink layers 602 and 604 are baked at an elevated process temperature (e.g., from 50° C. to 200° C.). Such alternating layers may be disposed using any suitable discrete or continuous deposition process (e.g., physical vapor deposition). Inclusion of such a stack may be disadvantageous in that incorporating the layers may add manufacturing costs over embodiments including less expensive materials (e.g., an air gap and second substrate 607, a monolithic layer of a higher index material).

Referring still to FIG. 3A, irrespective of the particular structure used for the intermediate layer 600, the pattern in the first ink layer 602 generally provides a desired appearance in reflection by altering the optical transmission properties of the substrate 450. Light reflected from the intermediate layer 600 is transmitted through the first ink layer 602 to provide a desired appearance in reflection. More specifically, the particular spectrum of light transmitted through the first ink layer 602 may vary as a function of position to achieve a particular appearance in reflection. Such transmission variations may alter the appearance of images rendered by the light source 540 when the deadfront article 400 is viewed in transmission by introducing color distortions in the images. If the first ink layer 602 forms a pattern of two or more colors, for example, different regions of the first ink layer 602 associated with the different colors will have different transmission spectra. Such different transmission spectra can alter the perceived color of light emitted by the light source 540 in different ways so that the pattern formed in the first ink layer 602 is visible in the images rendered by the light source 540. To illustrate, in an example where the first ink layer 602 forms a woodgrain pattern, the woodgrain pattern may be visible when images generated by the light source 540 are transmitted through the deadfront article 400, which may distract viewers and degrade image quality. Put differently, while the pattern formed by the first ink layer 602 is desired to appear from reflections of ambient light when the light source 540 is off, the appearance of such a pattern within light transmitted through the deadfront article 400 is generally not desired. Changes in the optical transmission performance of the substrate 450 caused via the incorporation of the first ink layer 602 causes at least a portion of the substrate 450 (when the first ink layer 602 is disposed therein) to deviate from a desired appearance in transmission.

Figure 3B:
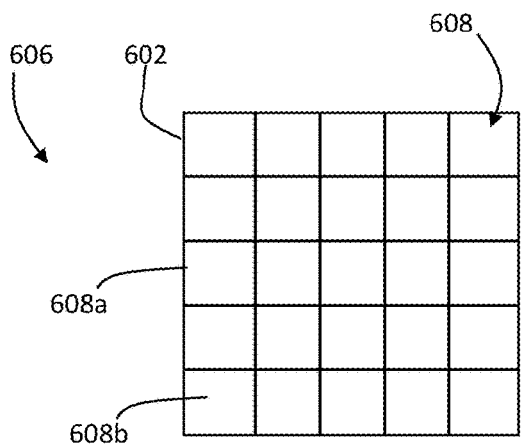
FIG. 3B schematically depicts a first plurality of regions of a first ink layer of the deadfront assembly depicted in FIG. 3A, according to one or more embodiments of the present disclosure.

In view of the foregoing, the deadfront assembly 460 incorporates the second ink layer 604 to counteract the deviations from the desired appearance in transmission associated with the first ink layer 602. The structure of the second ink layer 604 may be further understood in view of FIGS. 3B and 3C. FIG. 3B schematically depicts a portion of an image 606 rendered by the first ink layer 602. As shown, the first ink layer 602 comprises a first plurality of regions 608. Each of the first plurality of regions 608 may be a portion of the image 606 that is configured to exhibit a consistent color from reflected light. In embodiments, for example, each of the first plurality of regions 608 corresponds to a pixel in an image that is input into a printing device (e.g., an inkjet printing device). The size of each of the first plurality of regions 608 may depend on the manner with which the first ink layer 602 is printed (e.g., drop size, printing resolution, etc.). While the first plurality of regions 608 are depicted as being the same size and shape, it should be understood that the first plurality of regions 608 may deviate from one another in terms of size and shape due to inherent properties of the printing process.

In embodiments, at least some of the first plurality of regions 608 may deviate from one another in terms of color. For example, a region 608a may exhibit a first color (or first transmission spectrum) when light from the light source 540 is transmitted therethrough, while a region 608b may exhibit a second color (or second transmission spectrum) when light from the light source 540 is transmitted therethrough. Even if the same light from the light source 540 is emitted through both of the regions 608a and 608b, the portions of the image overlapping the regions 608a and 608b may appear to be different colors from one another. This example demonstrates how the different absorption spectra associated with the inks used to form the various regions of the first ink layer 602 can introduce unwanted color variations in images transmitted by the light source 540 through the deadfront article 400.

Figure 4A:
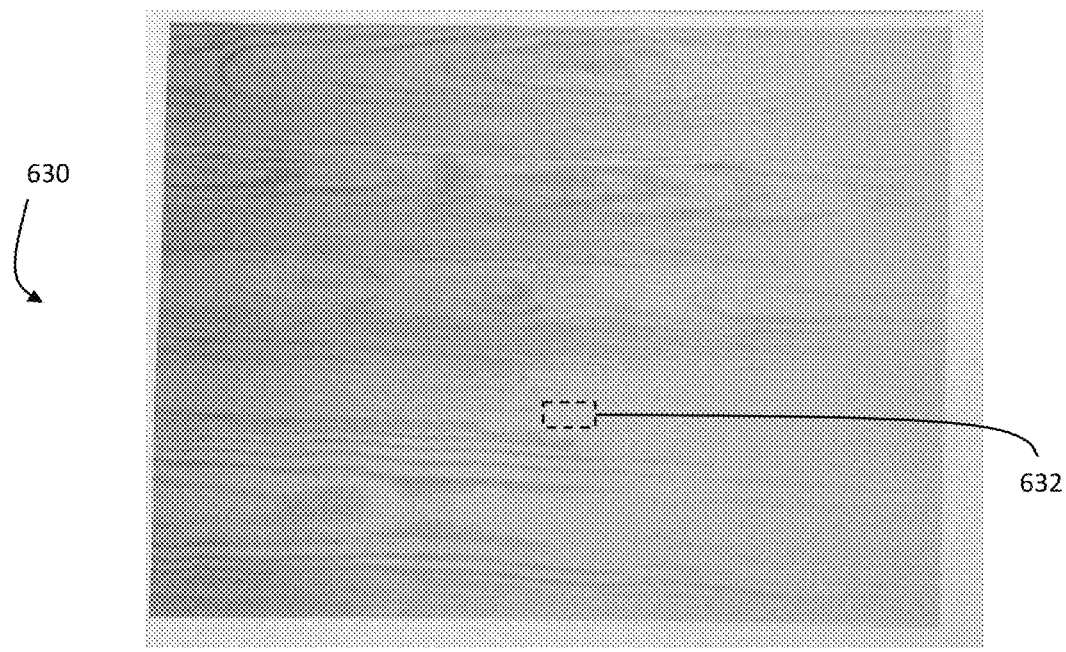
FIG. 4A depicts an image of a first ink layer disposed on a transparency, according to one or more embodiments of the present disclosure.
Figure 4B:
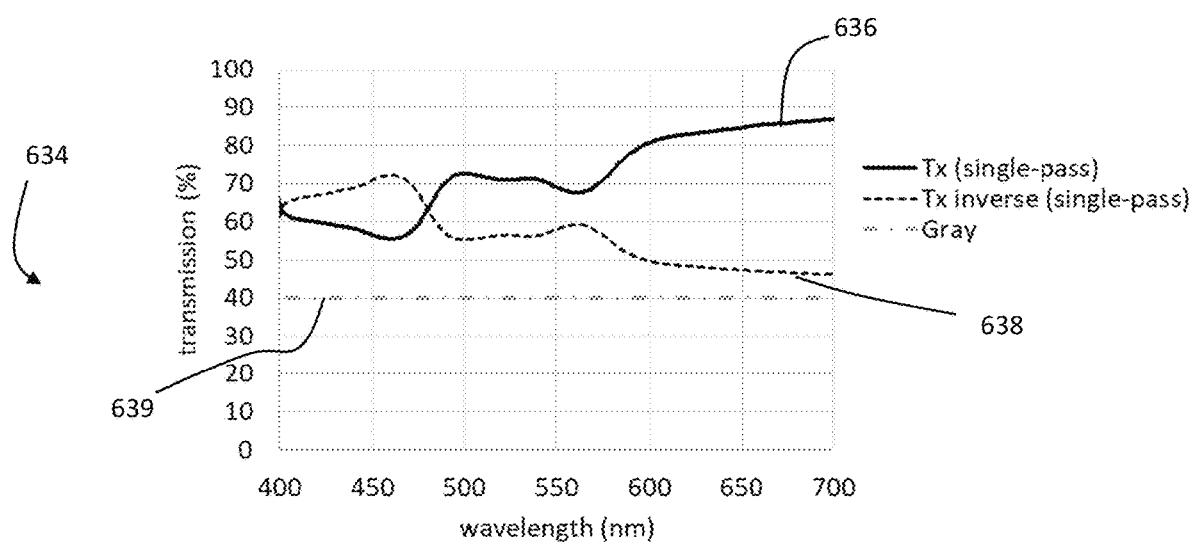
FIG. 4B is a plot of a target optical transmission spectra of a deadfront article, a first transmission spectra associated with the first ink layer depicted in FIG. 4A, and a second transmission spectra associated with a second ink layer, according to one or more embodiments of the present disclosure.

FIG. 4A depicts an example first ink layer 630 printed on a transparency according to an example described herein. The first ink layer 630 was printed to exhibit a woodgrain pattern, with different regions of the first ink layer 630 having different transmission spectra so that, when the first ink layer 630 is illuminated with ambient light, the woodgrain pattern is visible through the first ink layer 630. FIG. 4B is a plot 634 of a transmission spectrum 636 of a region of the first ink layer 630 within a portion 632 configured to exhibit a brown color. As shown, the absorption spectra of the inks used to form the first ink layer 630 in the represented region cause the transmission spectrum of the first ink layer 630 to be non-uniform over the wavelength range from 400 nm to 700 nm. As a result, any light with a spectrum different than the transmission spectrum 636 will be altered by passing through the first ink layer 630, with the first ink layer 630 tending to absorb more light at wavelengths less than 550 nm than at wavelengths greater than 550 nm. Such an effect would alter a color appearance of a pixel of an image rendered by a display being transmitted through the first ink layer 630.

The transmission spectrum 636 is a modelled example of an ink layer designed to exhibit a brown color based on a CMY color model disposed on a transparent substrate. It was assumed that there was a spectrally flat 3% Fresnel reflection on each side of the substrate. Generally the transmission can be calculated by $$T_1(\lambda) = (1 - Rx_{Fresnel1}) * T_{ink1}(\lambda)(1 - R_{Fresnel1}) \quad (1)$$

With approximations by removing low amplitude terms the transmission of the substrate with the first ink layer 630 can be approximated as $$T_1(\lambda) \sim T_{ink1}(\lambda)(1 - 2R_{Fresnel1}). \quad (2)$$

If the presence of a second ink layer disposed on a second transparent substrate is presumed (e.g., like the second ink layer 604 and second substrate 607 depicted in FIG. 3A), the transmission spectrum of the second substrate can be computed using the above approximation as $$T_2(\lambda) \sim T_{ink2}(\lambda)(1 - 2R_{Fresnel2}). \quad (3)$$

If the first and second substrates in this example are placed in optical series, the combined transmission through the two substrates with an air gap between them is approximately equal to a product of $T_1(\lambda)$ and $T_2(\lambda)$.

Referring still to this example with the first and second ink layers disposed on two transparent substrates, the total reflection from the combined stack is given by $$R_{Total}(\lambda) \sim \quad (4)$$
$$R_{Fresnel1} + (1 - R_{Fresnel1})T_{ink1}(\lambda)R_{Fresnel1}T_{ink1}(\lambda)(1 - R_{Fresnel1}) +$$
$$(1 - R_{Fresnel1})T_{ink1}(\lambda)(1 - R_{Fresnel1})R_{Fresnel2}(1 - R_{Fresnel1})T_{ink1}(\lambda)$$
$$(1 - R_{Fresnel1}) + (1 - R_{Fresnel1})T_{ink1}(\lambda)(1 - R_{Fresnel1})(1 - R_{Fresnel2})T_{ink2}(\lambda)$$
$$R_{Fresnel2}T_{ink2}(\lambda)(1 - R_{Fresnel2})(1 - R_{Fresnel1})T_{ink1}(\lambda)(1 - R_{Fresnel1}).$$

Assuming small Fresnel coefficients (e.g., assuming that the first and second substrates have comparable refractive indices to the first and second ink layers) and simplifying Equation 4 through a series of approximations (ignoring the back surface contributions of the second substrate), the total reflection can be expressed as $$R_{Total}(\lambda) \sim R_{Fresnel1} + T_{ink1}^2(\lambda)[R_{Fresnel1} + R_{Fresnel2}], \quad (5)$$

which shows that the reflected color will mainly come from the square of the transmission spectrum of the front ink. The removed terms in Equations 4 and 5 will impact the contrast of the reflected image, but Applicant believes that these terms are generally spectrally flat by design. Such terms do not affect the perceived color, but only the contrast of the image.

The preceding analysis in Equations 1-5 demonstrate that the overall appearance of the stack in transmission depends on the transmission spectra of both the first and second ink layers, whereas the appearance in reflection depends mainly on the first ink layer. This indicates that the second ink layer may be used to affect the appearance of the article in transmission while having relatively little effect on the appearance of the article in reflection. In view of this, a target transmission spectrum $T_{target}(\lambda)$ may be provided for the article. Moreover, given a known transmission spectrum for the first ink layer $T_{ink1}(\lambda)$ (the transmission spectrum 636 depicted in FIG. 4B), a transmission spectrum for the second ink layer $T_{ink2}(\lambda)$ (shown as the transmission spectrum 638 in FIG. 4B) can be computed so that the product of $T_1(\lambda)$ and $T_2(\lambda)$ computed via Equations 2-3 equals $T_{target}(\lambda)$. Further approximating the product of $T_1(\lambda)$ and $T_2(\lambda)$ computed via Equations 2-3 by removing terms of small amplitude reveals that that $T_{ink2}(\lambda)$ can be approximately computed as $$T_{ink2}(\lambda) \sim \frac{T_{target}(\lambda)}{T_{ink1}(\lambda)}. \quad (6)$$

$T_{target}(\lambda)$ is generally selected so that light transmitted through the article has a desired appearance. In the example depicted in FIG. 4B, a target transmission spectrum 639 is a neutral gray having a constant transmittance of approximately 40% throughout the wavelength range from 400 nm to 700 nm. Constant values that are greater than or equal to 20% and less than or equal to 60% are believed to be suitable for providing an article with a generally neutral appearance in transmission, while blocking sufficient light to facilitate effective deadfronting. Utilizing a constant as the target transmission spectrum 639 beneficially ensures that the combination of the first and second ink layers do not change the perceived color of any light transmitted through the combined stack. A variety of target transmission spectra are contemplated and within the scope of the present disclosure. For example a sloped target transmission spectrum (e.g., where the transmission increases or decreases with increasing wavelength) a stepwise target transmission spectrum, or other suitable target may be used depending on any visual effects desired to be achieved through the deadfront article.

Figure 3C:
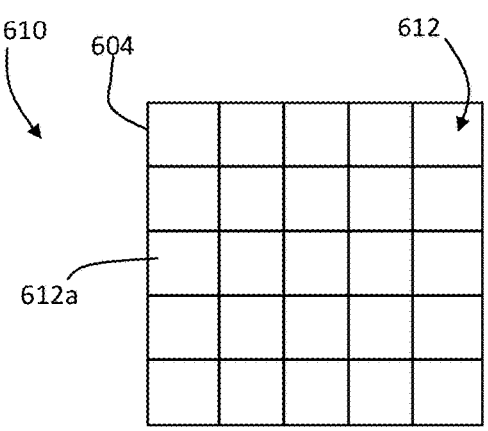
FIG. 3C schematically depicts a second plurality of regions of a second ink layer of the deadfront assembly depicted in FIG. 3B, according to one or more embodiments of the present disclosure.

Inputting the target transmission spectrum 639 and the transmission spectrum 636 into Equation 6 results in the transmission spectrum 638 for a region of a second ink layer 604. For example, referring back to the example depicted in FIGS. 3A-3C, FIG. 3C schematically depicts a portion of an image 610 rendered by the second ink layer 604 in accordance with this example. As shown, the second ink layer 604 comprises a second plurality of regions 612. Each of the second plurality of regions 612 may be a portion of the image 610 that is configured to exhibit a consistent color. The second plurality of regions 612 generally overlap with the first plurality of regions 608 of the first ink layer 602 along an alignment axis 620 (see FIG. 3A). In embodiments, the alignment axis 620 extends in a direction perpendicular to the first and second major surfaces 470 and 480 of the substrate 450. As shown, the second ink layer 604 includes a region 612a that overlaps the region 608a of the first ink layer 602. In an example, the inks used to form the region 612a are selected to provide a transmission spectrum computed using Equation 6 (or its metameric equivalent) based on the transmission spectrum of the region 608a. Repeating such a process for each region of the image 606 of the first ink layer 602 provides a pattern for the second ink layer 604 so that the second ink layer 604 is selected to provide a target appearance in transmission without significantly effecting the appearance of the deadfront article 400 when viewing reflections of ambient light.

Such an approach of calculating an inverse color for each of the second plurality of regions 612 of the second ink layer 604 based on a color of an overlapping one of the first plurality of regions 608 of the first ink layer 602 is computationally complex. This approach of computing an inverse color can be approximated by converting the image in first ink layer 602 to an RGB color space and using the RGB color space to compute color values for the second ink layer 604. The visible spectra (from 400 nm to 700 nm) of each of the first plurality of regions 608 can be converted to the tristimulus X, Y, Z coordinates in accordance with the CIE 1931 color space. The X, Y, Z values may then be converted to a suitable RGB values based on the light source 540 being used, which can be used to compute an inverse of the first ink layer 602 based on target color values for each region of the deadfront article 400 (or overlapping ones of the first plurality of regions 608 and the second plurality of regions 612).

In an illustrative example, X, Y, Z coordinates for the transmission spectra 636, 638, and 639 depicted in FIG. 4B were calculated based on a D65 illuminant and using the CIE 1931 2-degree standard observer, as found in ISO/CIE 11664-2:2019 "Colorimetry—Part 1: CIE standard colorimetric observers," hereby incorporated by reference in its entirety. The X, Y, Z values (integrals were evaluated from 380 nm to 780 nm) were then converted to sRGB values in accordance with the IEC 61966-2-1:1999 standard. The results are provided in the Table 1 below.

TABLE 1

|  | X | Y | Z | R | G | B |
|---|---|---|---|---|---|---|
| $T_{ink1}$ | 0.700 | 0.726 | 0.646 | 0.831 | 0.710 | 0.574 |
| $T_{ink2}$ | 0.525 | 0.554 | 0.738 | 0.482 | 0.562 | 0.697 |
| $R_{total}$ | 0.058 | 0.060 | 0.056 | 0.342 | 0.293 | 0.248 |
| $T_{target}$ | 0.380 | 0.400 | 0.436 | 0.400 | 0.400 | 0.400 |

The $R_{total}$ values were based on a reflection spectrum computed using Equation 4. The values in the Table 1 were obtained without gamma scaling of the RGB values. When the XYZ values are normalized for values associated with the CIE1931 D65 white point values and the sRGB values are scaled from 0 to 255, the results are as provided in the Table 2 below.

TABLE 2

|  | X/Xw | Y/Yw | Z/Zw | R | G | B |
|---|---|---|---|---|---|---|
| $T_{ink1}$ | 0.737 | 0.726 | 0.593 | 212 | 181 | 146 |
| $T_{ink2}$ | 0.553 | 0.554 | 0.678 | 123 | 143 | 178 |
| $R_{total}$ | 0.061 | 0.060 | 0.051 | 87 | 75 | 63 |
| $T_{target}$ | 0.400 | 0.400 | 0.400 | 102 | 102 | 102 |

As shown in the Tables 1 and 2, Applicant has unexpectedly found that the XYZ values calculated based on the target transmission spectra 639 and the transmission spectra 636 and 638 depicted in FIG. 4B satisfy the following approximate relationships:

$$X_{ink2} \sim \frac{T_{target}}{X_{ink1}} \tag{7}$$

$$Y_{ink2} \sim \frac{T_{target}}{Y_{ink1}} \tag{8}$$

$$Z_{ink2} \sim \frac{T_{target}}{Z_{ink1}}. \tag{9}$$

The sRGB values (unscaled) also follow the following approximate relationships:

$$R_{ink2} \sim \frac{T_{target}}{R_{ink1}} \tag{10}$$

$$G_{ink2} \sim \frac{T_{target}}{G_{ink1}} \tag{11}$$

$$B_{ink2} \sim \frac{T_{target}}{B_{ink1}}. \tag{12}$$

Without wishing to be bound by theory, it is believed that the ratios in Equations 7-12 are fairly accurate approximations (within 10% of the actually calculated values in Tables 1 and 2) due to flat regions in the transmission spectrum of various CMYK inks and the limited spectral range of each of the CIE color-matching spectrum. Nevertheless, Applicant believes that the ratios in Equations 7-12 serve as an efficient manner to calculate an inverse image of the first ink layer 602 for determining the pattern of the second ink layer 604. RGB values for various pixels in the image formed by the first ink layer 602 can be inverted and multiplied by target values for the deadfront article 400 to determine RGB values for each pixel of the second ink layer 604. Target RGB values (without gamma correction and being scaled) may be greater than or equal to 90 and less than or equal to 110 (e.g., each of the RGB values may be the same so that the deadfront article 400 is configured to exhibit a uniform gray appearance when illuminated by a white light source). Such RGB values may be input into an ICC file associated with a printing device, which will convert the values to CMYK values for printing each pixel of the image formed by the second ink layer 604. Target XYZ values for each of the pixels may also be used. In embodiments, such target XYZ values are greater than or equal to 0.30 and less than or equal to 0.50 (when not normalized to the D65 white point values).

Figure 4C:
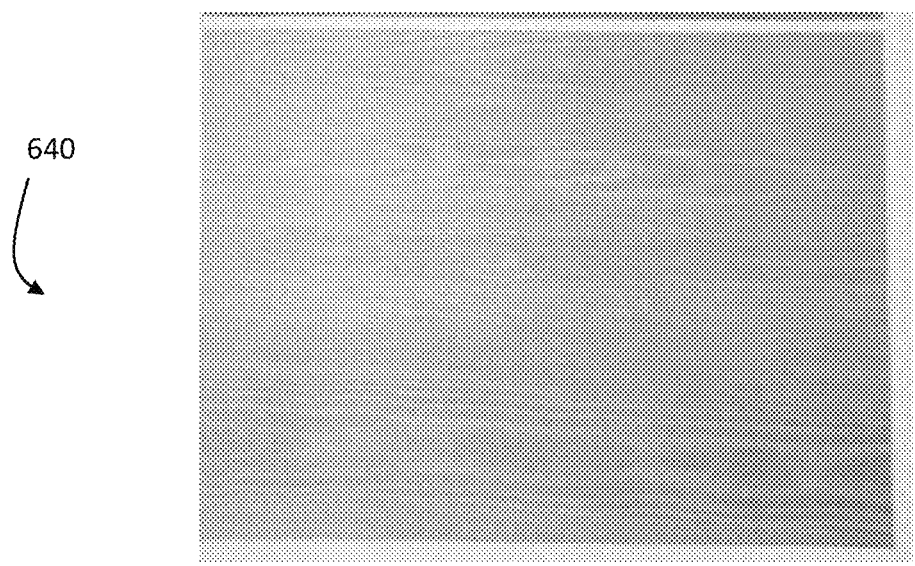
FIG. 4C depicts an image of a second ink layer configured to suppress an appearance of the first ink layer depicted in FIG. 4A in transmission, according to one or more embodiments of the present disclosure.

FIG. 4C depicts an example second ink layer 640 computed and printed using such an approach (e.g., the pattern was computed using the target RGB values in the Table 1 and RGB values associated with the regions of the first ink layer 630 depicted in FIG. 4A, and the computed pattern was subsequently printed on a transparency). As shown, the second ink layer 640 is an inverse image of the first ink layer 630 depicted in FIG. 4A, with the regions in the first ink layer 630 having relatively high optical transmission overlapping regions in the second ink layer 640 having relatively low optical transmission, and vice versa. Aligning the first and second ink layers 630 and 640 depicted in FIGS. 4A and 4C largely eliminated the pattern of the first ink layer 630 in transmission, demonstrating the efficacy of the approach described herein.

Figure 4D:
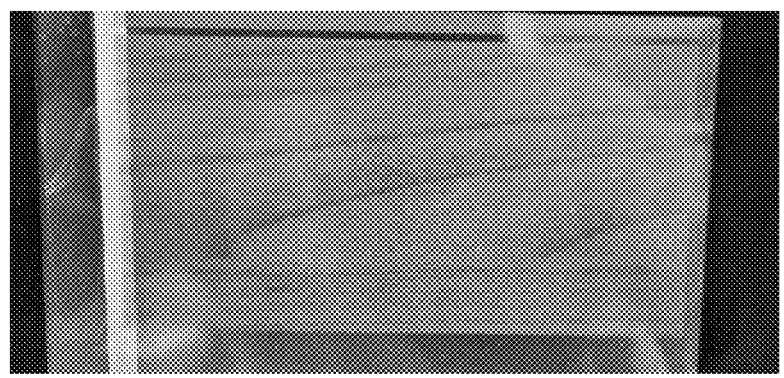
FIG. 4D is an image of a prototype formed using the first and second ink layers depicted in FIGS. 4A and 4C disposed on a display not emitting light and with ambient reflection, according to one or more embodiments of the present disclosure.
Figure 4E:
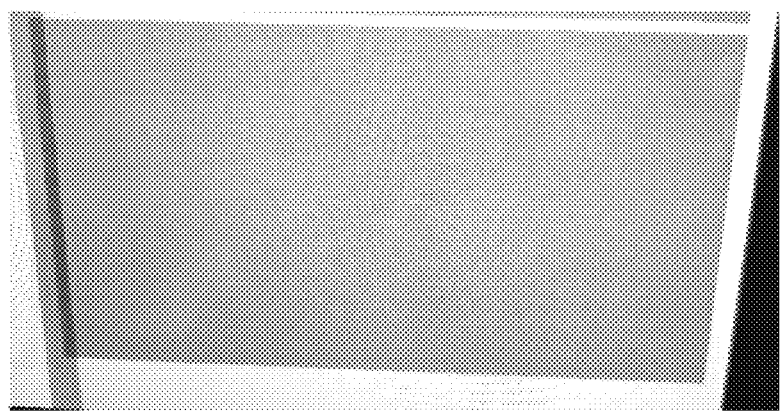
FIG. 4E is an image of the prototype depicted in FIG. 4E when the display is emitting white light, according to one or more embodiments of the present disclosure.
Figure 4F:
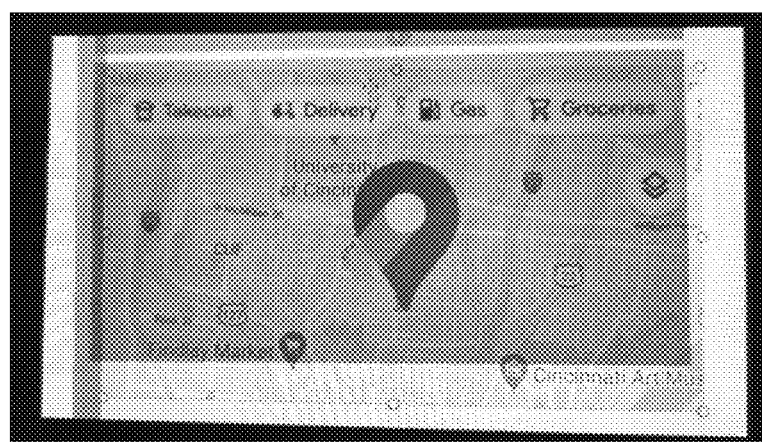
FIG. 4F is an image of the prototype depicted in FIG. 4G when the display is emitting an image that is transmitted through the prototype, according to one or more embodiments of the present disclosure.

With reference to FIGS. 4D-4F, a prototype was constructed using the calculation described with respect the first and second ink layers 630 and 640 depicted in FIGS. 4A and 4C (though a different image for the wood-grain pattern was used). Specifically, to construct the prototype, the first and second ink layers 602 and 604 were aligned with one another with an air gap (as the intermediate layer 600) in between and disposed on a display. The ink layers were printed using a LaserJet® printer. FIG. 4D is an image 644 of the prototype on a black display. As shown, the wood grain pattern formed by the first ink layer 630 is clearly visible in reflection from ambient light. FIG. 4E is an image 646 of the prototype with the display emitting ambient light. As shown, the wood grain pattern is no longer visible, as the light from the display drowned out the light in reflection. FIG. 4F is an image 648 of the prototype with the display emitting an image. The wood grain pattern is virtually invisible and the image is clearly visible with little color distortion (the combination of the ink layers just lowered the luminance of the image). These results demonstrate the efficacy of the approach described herein in providing a deadfront article that exhibits a desired appearance in reflection from ambient light, while also facilitating transmission of an image therethrough with improved color distortion performance as compared to certain existing deadfronting approaches. In constructing examples, the best results were achieved when no gamma correction was applied during computing the RGB values for the images formed in the first ink layer 602. However, in such cases, it was beneficial to use a light-colored image Ii whose minimum value of R, G or B across all the pixels is limited to $255*T_{target}$. When $T_{target}=0.4$ as in FIG. 4B, the minimum value for any of the colors in the image of the first ink layer 602 is >102. If the first ink layer 602 had a pixel with a smaller RGB value, the corresponding color of that pixel in the inverse image would need to be >255. For a color technology with greater than 8-bit color, say n-bit color, this threshold would be $T_{target}*(2^n-1)$.

In the preceding example and in the Tables 1 and 2, it was assumed that a D65 illuminant was used in both reflection and transmission. D65 illuminants are suitable for simulating outdoor ambient light (and may be suitable for measuring the perceived color of the deadfront article 400 in reflection). In determining suitable RGB values in transmission, however, it may be beneficial to take the particular light source 540 being used into account. For example, one input a spectral power distribution (I(λ)) in the CIE 1931 color space XYZ formulas that is associated with the particular light source 540 being used (e.g., the illumination spectrum may be associated with the light source 540 emitting a white image). However, it is believed that the ratios in Equations 7-12 still provide relatively accurate results for most commercially available display panels.

With reference to FIG. 2, an effect of the second ink layer 604 described herein is that light emitted by the light source 540 is not perceptively altered in color appearance (at least to a significant extent) by passing through the deadfront assembly 460. Overlapping ones of the first and second pluralities of regions 608 and 612 (see FIGS. 3B-3C) are specifically constructed so to avoid the perceived color of light emitted by the light source 540 being altered via transmission through the deadfront article 400. In embodiments, the light emitted by a portion of the light source 540 (e.g., a particular pixel, or sub-array of pixels, of a display) may have a particular color defined by target CIE L*a*b* values (measured when the light is emitted by the light source 540 and not transmitted through the deadfront article 400). The regions of the first and second ink layers 602 and 604 overlapping that portion of the light source 540 may be configured such that the light transmitted through the deadfront article 400 exhibits a ΔE value, computed in accordance with the CIE1976 formula and with the L*a*b* values of the light source 540 as reference values, of less than or equal to 5.0 (e.g., less than or equal to 4.5, less than or equal to 4.0, less than or equal to 3.5, less than or equal to 3.0, less than or equal to 2.5, less than or equal to 2.0, less than or equal to 1.5, or even less than or equal to 1.0). Put differently, the light emitted by the light source 540 (e.g., from each pixel or sub-array of pixels) may exhibit a series of L*a*b* values and pass through an overlapping pair of the regions of the first and second ink layers 602 and 604. The first and second ink layers 602 and 604 may be configured such that a maximum ΔE value (measured between the light that is transmitted through the deadfront article 400 and values associated with the light source 540 in isolation) across an entirety of the deadfront article 400 is less than or equal to 5.0 (e.g., less than or equal to 4.5, less than or equal to 4.0, less than or equal to 3.5, less than or equal to 3.0, less than or equal to 2.5, less than or equal to 2.0, less than or equal to 1.5, or even less than or equal to 1.0). Such lack of color deviation between emitted and transmitted images is achieved even though the first ink layer 602 is specifically fabricated to possess colors that deviate from the images rendered by the light source 540 (e.g., when illuminated by a D65 illuminant, at least some of the first plurality of regions 608 may be configured to exhibit a* and b* values having magnitudes that are greater than 5.0, greater than 10.0, greater than 20.0, greater than 30.0, or even greater than 50.0).

As used herein, L*, a*, and b* values may be computed from the tristimulus XYZ coordinates (measured at the 2° standard observer) of the 1931 CIE color coordinate space using the following formulas:

$$L^* = 116 f\left(\frac{Y}{Y_W}\right) - 16 \tag{13}$$

$$a^* = 500\left(f\left(\frac{X}{X_W}\right) - f\left(\frac{Y}{Y_W}\right)\right) \tag{14}$$

$$b^* = 200\left(f\left(\frac{Y}{Y_W}\right) - f\left(\frac{Z}{Z_W}\right)\right) \tag{15}$$

where the $X_W$, $Y_W$, and $Z_W$ refer to the white the white point of the illuminant as a reference:

$$X_W = \int I_{illum}(\lambda)\bar{x}(\lambda)d\lambda \quad (16)$$

$$Y_W = \int I_{illum}(\lambda)\bar{y}(\lambda)d\lambda \quad (17)$$

$$Z_W = \int I_{illum}(\lambda)\bar{z}(\lambda)d\lambda \quad (18)$$

where $\bar{x}(\lambda)$, $\bar{y}(\lambda)$, and $\bar{z}(\lambda)$ are the CIE color matching functions. Unless expressed otherwise herein, the illuminant is a D65 illuminant, although in some cases the illuminant may be the light source 540 operating at its white point. In Equations 13-15, and for $\delta = 6/29$, the function f(t), is given by:

$$f(t) = \begin{cases} \sqrt[3]{t} & \text{if } t > \delta^3 \\ \dfrac{t}{3\delta^2} + \dfrac{4}{29} & \text{otherwise} \end{cases} \quad (19)$$

When the light source 540 is set to a white point (to emit a completely white image through the deadfront article 400), light transmitted from the light source 540 through the deadfront article 400 may exhibit a L* value that is greater than or equal to 50 and less than or equal to 80 (e.g., greater than or equal to 55 and less than or equal to 75, greater than or equal to 60 and less than or equal to 70), an a* that is greater than or equal to −5.0 and less than or equal to 5.0 (e.g., greater than or equal to −4.5 and less than or equal to 4.5, greater than or equal to −4.0 and less than or equal to 4.0, greater than or equal to −3.5 and less than or equal to 3.5, greater than or equal to −3.0 and less than or equal to 3.0, greater than or equal to −2.5 and less than or equal to 2.5, greater than or equal to −1.0 and less than or equal to 1.0), and a b* that is greater than or equal to −5.0 and less than or equal to 5.0 (e.g., greater than or equal to −4.5 and less than or equal to 4.5, greater than or equal to −4.0 and less than or equal to 4.0, greater than or equal to −3.5 and less than or equal to 3.5, greater than or equal to −3.0 and less than or equal to 3.0, greater than or equal to −2.5 and less than or equal to 2.5, greater than or equal to −1.0 and less than or equal to 1.0), such that white light emitted by the light source 540 is still perceived as white after transmission through the deadfront article 540. Moreover, when the light source 540 is set to a white point (e.g., associated with a particular display panel), the light transmitted through the deadfront article 400 may also exhibit ΔE values lying within the ranges described herein.

While RGB values (or XYZ values) for regions the first and second ink layers 602 and 604 may be computed based on the particular light source and target values, it is believed that white light from other sources (e.g., other than the light source 540) transmitted through the deadfront article 400 will also exhibit a similar appearance For example, in embodiments, when light from a D65 illuminant is transmitted through the deadfront article 400 (being initially incident on the second ink layer 604 and normally incident on the substrate 450), the light exhibits a L* value that is greater than or equal to 50 and less than or equal to 80 (e.g., greater than or equal to 55 and less than or equal to 75, greater than or equal to 60 and less than or equal to 70), an a* that is greater than or equal to −5.0 and less than or equal to 5.0 (e.g., greater than or equal to −4.5 and less than or equal to 4.5, greater than or equal to −4.0 and less than or equal to 4.0, greater than or equal to −3.5 and less than or equal to 3.5, greater than or equal to −3.0 and less than or equal to 3.0, greater than or equal to −2.5 and less than or equal to 2.5, greater than or equal to −1.0 and less than or equal to 1.0), and a b* that is greater than or equal to −5.0 and less than or equal to 5.0 (e.g., greater than or equal to −4.5 and less than or equal to 4.5, greater than or equal to −4.0 and less than or equal to 4.0, greater than or equal to −3.5 and less than or equal to 3.5, greater than or equal to −3.0 and less than or equal to 3.0, greater than or equal to −2.5 and less than or equal to 2.5, greater than or equal to −1.0 and less than or equal to 1.0)

Figure 5:
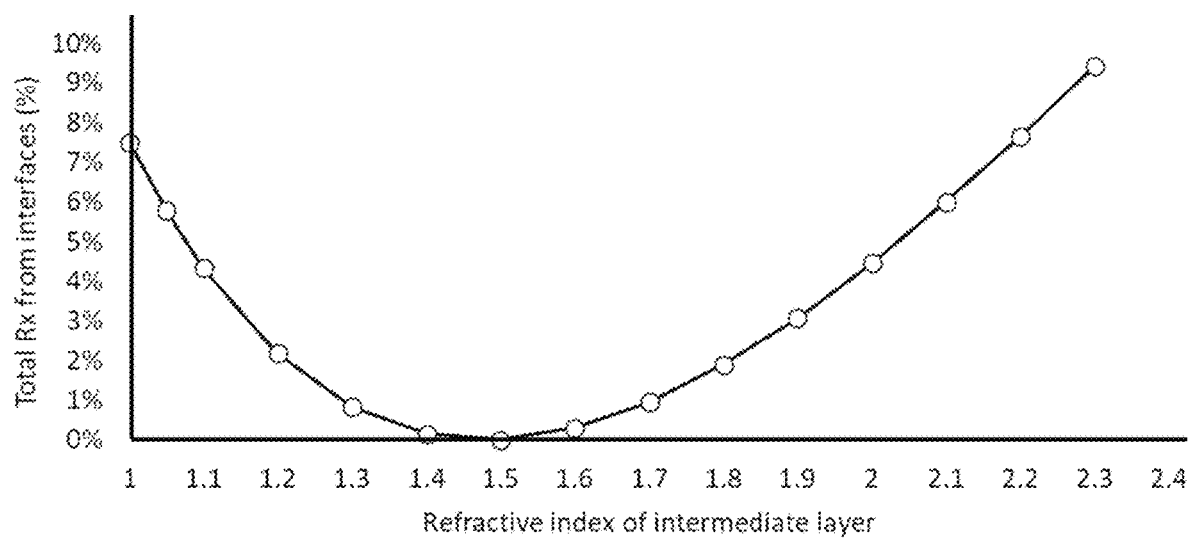
FIG. 5 depicts a plot of a predicted reflection from interfaces of a deadfront assembly as a function of a refractive index of an intermediate layer between a first ink layer and a second ink layer, according to one or more embodiments of the present disclosure.

FIG. 5 is a plot 700 of modelled Fresnel reflections from two interfaces (assuming normal incidence) between the intermediate layer 600 and first and second ink layers 602 and 604 depicted in FIG. 3A (assuming that the intermediate layer 600 is monolithic). The first and second ink layers 602 and 604 were presumed to have a refractive index of 1.48 (at 550 nm) in this example. As shown, when the refractive index of the intermediate layer 600 is less than 1.3 and greater than 1.7, the total reflectance of the deadfront assembly 460 was predicted to be greater than 1.0%, which is believed to be a sufficient amount for certain patterns. When the refractive index of the intermediate layer 600 is greater than or equal to 1.8 and less than or equal to 1.2, the total reflectance of the deadfront assembly 460 was predicted to be greater than 2.0%, which aids in the pattern formed in the first ink layer 602 being visible in reflection. When the refractive index of the intermediate layer 600 is greater than or equal to 2.0 and less than or equal to 1.1 the total reflectance of the deadfront assembly 460 was predicted to be greater than 4.0%. Such greater reflectance values may increase the contrast of the image of the first ink layer 602 when viewed in reflection under ambient light. This analysis demonstrates suitable refractive indices of the intermediate layer 600 when a reflector layer 609 is not used in the deadfront assembly 460.

Figure 6:
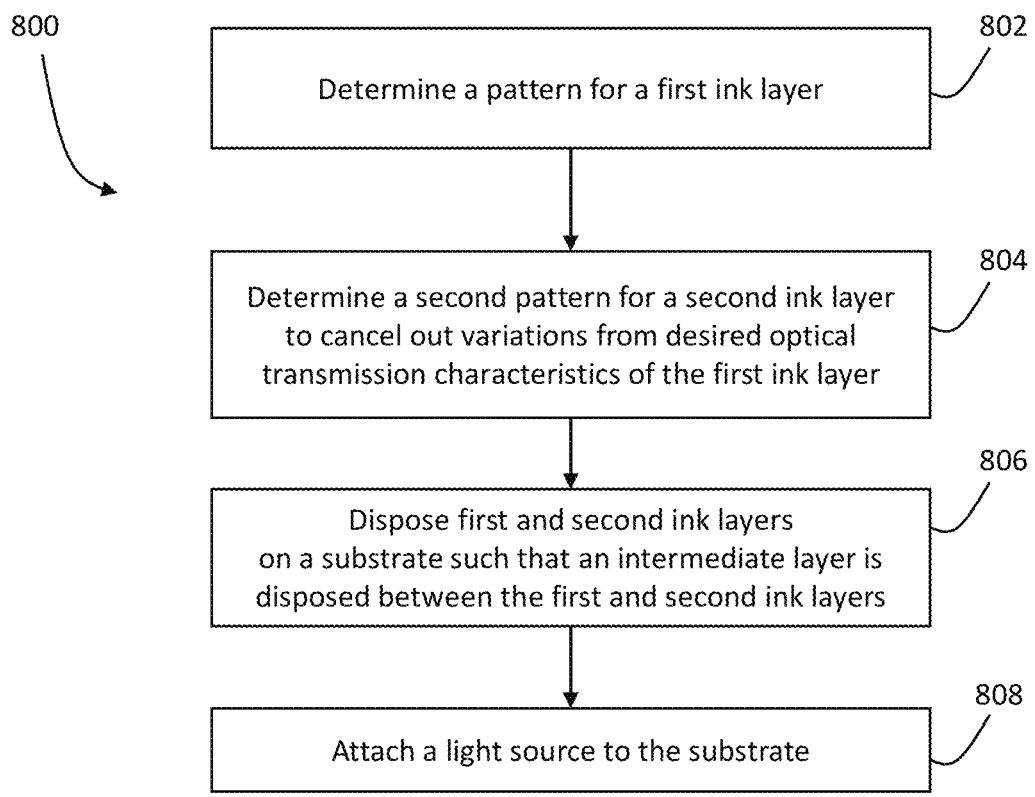
FIG. 6 is a flow diagram of a method of fabricating a deadfront article, according to one or more embodiments of the present disclosure.

FIG. 6 is a flow diagram of a method 800 of fabricating a deadfront article, according to an example embodiment. The method 800 may be used to fabricate the deadfront article 400 described herein with respect to FIGS. 2-3B and to attach the light source 540 thereto. Accordingly, reference to various components depicted in FIGS. 2-3B will be used to aid in describing the method 800. At block 802, the pattern for the first ink layer 602 is determined. As described herein, the pattern for the first ink layer 602 may be determined based on a context of the deadfront article 400. Any suitable pattern (e.g., wood grain, brushed metal, carbon fiber, fabric) may be used depending on the implementation. The pattern may be determined based on an image of another structural element (e.g., a component of a dashboard, seat, trim element) to be used in conjunction with the deadfront article 400. For example, an image of a wood grain trim element may be taken and used as a target pattern for the first ink layer 602 so that the deadfront article 400 will blend in with its surrounding components. The pattern may include a matrix of RGB values to be input into a printer device for conversion via an ICC file to CMYK values to facilitate deposition of inks in the pattern using a subtractive color model.

At block 804, a pattern for the second ink layer 604 is determined such that the second ink layer is designed to cancel out variations of the first ink layer from desired optical transmission characteristics. In embodiments, the desired optical transmission characteristics are target color coordinates (e.g., XYZ values or RGB values) measured from light transmitted through the deadfront assembly 460 and the substrate 450. The light may have an illumination spectrum associated with the light source 540. At least some of the first plurality of regions 608 of pattern for the first ink layer 602 may exhibit color coordinates that deviate from desired values when illuminated by light from the light source 540 (having a particular illumination spectrum). The pattern for the second ink layer 604 may be determined by computing an inverse color for ones of the second plurality of regions 612 based on the transmission characteristics exhibited by overlapping ones of the first plurality of regions 608 and a target value. In embodiments, the target value is a transmission spectrum $T_{target}(\lambda)$ over the wavelength range from 400 nm to 700 nm. An inverse transmission spectrum may be computed for each of the second plurality of regions 612 as a ratio of $T_{target}(\lambda)/T_1(\lambda)$, where $T_1(\lambda)$ is a transmission spectrum associated with an overlapping one of first plurality of regions 608. The inverse transmission spectrum may then be used to calculate a combination of inks suitable for each of the second plurality of regions 612. In embodiments, XYZ or RGB values associated with the first plurality of regions 608 may be inverted and multiplied by target values for the coordinates to compute inverse values for overlapping ones of the second plurality of regions 612 of the second ink layer 604.

At block 806, once the patterns for the first and second ink layers 602 and 604 are determined, the first and second ink layers 602 and 604 are disposed on the substrate 450 such that the intermediate layer 600 is disposed between the first and second ink layers 602 and 604. At block 808, the light source 540 is attached to the substrate 450. Deposition of the first and second ink layers 602 and 604 and attachment of the light source 540 may take a variety of forms depending on the implantation. For example, in embodiments, the intermediate layer 600 comprises a second substrate 607. The intermediate layer 600 may consist or consist essentially of the second substrate 607 in some embodiments (such that the second substrate 607 is a monolithic layer formed of the same material, which may be a uniform composition or a composite). In such embodiments, one or more of the first and second ink layers 602 and 604 are deposited onto the second substrate 607 prior to attachment to the substrate 450. The first and second ink layers 602 and 604, for example, may be inkjet printed on either side of the second substrate 607, which may be subsequently laminated on the light source 540 and then attached to the substrate 450. In embodiments, the first ink layer 602 is printed directly on the substrate 450 and the second ink layer is printed directly on a surface of the second substrate 607 (e.g., the surface of the second substrate 607 that is further form the substrate 450). The second substrate may be laminated to the light source 540 and subsequently attached to the light source 540.

In embodiments, the intermediate layer 600 further comprises a reflector layer 609 disposed on the second substrate 607. The reflector layer 609 may be a metallic layer or an alternating stack of high or low index materials, as described herein. Accordingly, in such embodiments, the method 800 may include depositing the reflector layer 609 on the second substrate 607 prior to deposition of the first and second ink layers 602 and 604 thereon. In embodiments, the second ink layer 604 is deposited on a third substrate (not depicted) beneath the reflector layer 609, and the third substrate may be laminated to the light source 540 and subsequently attached to the second substrate 607 and the substrate 450.

In embodiments, the intermediate layer 600 comprises an ink layer (e.g., a diffuse white or grey ink or a metallic ink) that is disposed between the first and second ink layers 602 and 604. In such embodiments, the first and second ink layers 602 and 604 as well as the intermediate layer 600 may be disposed on the same substrate. For example first and second ink layers 602 and 604 as well as the intermediate layer 600 may be disposed on the substrate 450 in direct contact with one another. In embodiments, at least one of the first ink layer 602 and the intermediate layer 600 is printed on the substrate 450, while the second ink layer 604 is printed on the second substrate 607. In embodiments, the intermediate layer 600 comprises an air gap disposed between the first ink layer 602 and the second ink layer 604. In such embodiments, attaching the light source 540 to the substrate 450 may include laminating the second substrate 607 (with the second ink layer 604 printed thereon) to the light source 540 and attaching the light source 540 and second substrate 607 to the substrate 450 with the support structure 605 such that the second ink layer 604 is held in spaced relation to the substrate 450 to form the air gap.

Glass Materials

Figure 7:
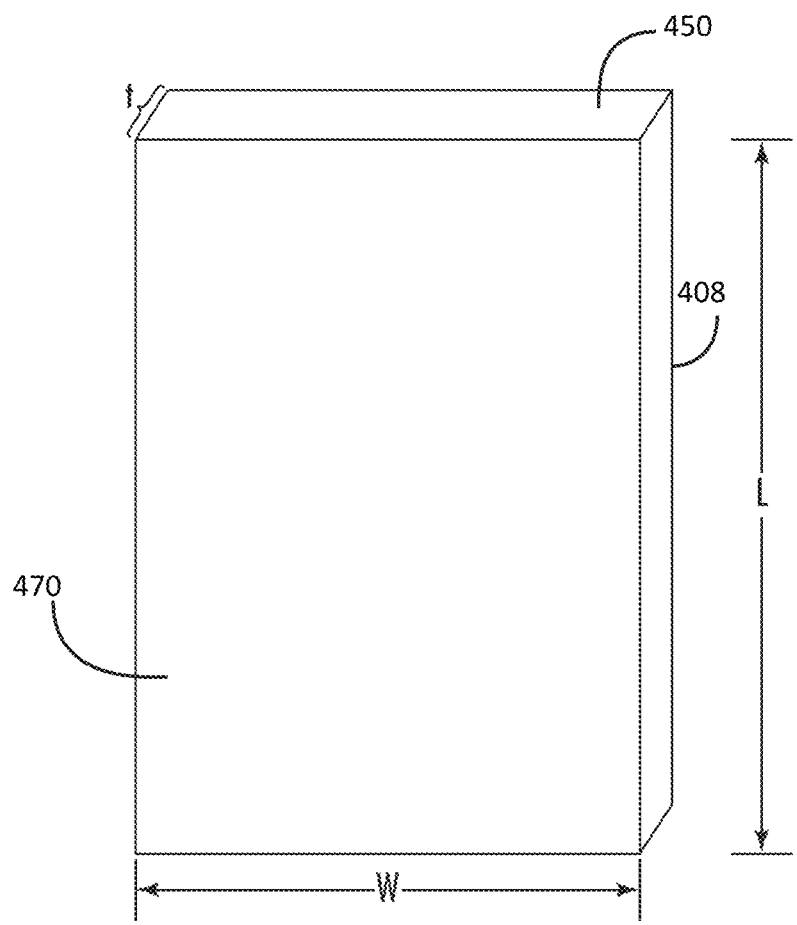
FIG. 7 schematically depicts a substrate according to one or more embodiments of the present disclosure.

Referring to FIG. 7, in embodiments the substrate 450 has a thickness t that is substantially constant over the width and length of the substrate 450 and is defined as a distance between the first major surface 470 and the second major surface 480. In various embodiments, T may refer to an average thickness or a maximum thickness of the substrate 450. In addition, the substrate 450 includes a width W defined as a first maximum dimension of one of the first or second major surfaces 470, 480 orthogonal to the thickness t, and a length L defined as a second maximum dimension of one of the first or second major surfaces 470, 480 orthogonal to both the thickness and the width. In other embodiments, W and L may be the average width and the average length of the substrate 450, respectively, and in other embodiments, W and L may be the maximum width and the maximum length of the substrate 450, respectively (e.g., for a glass substrate having a variable width or length).

In various embodiments, thickness t is 2 mm or less. In particular, the thickness t is from 0.30 mm to 2.0 mm. For example, thickness t may be in a range from about 0.30 mm to about 2.0 mm, from about 0.40 mm to about 2.0 mm, from about 0.50 mm to about 2.0 mm, from about 0.60 mm to about 2.0 mm, from about 0.70 mm to about 2.0 mm, from about 0.80 mm to about 2.0 mm, from about 0.90 mm to about 2.0 mm, from about 1.0 mm to about 2.0 mm, from about 1.1 mm to about 2.0 mm, from about 1.2 mm to about 2.0 mm, from about 1.3 mm to about 2.0 mm, from about 1.4 mm to about 2.0 mm, from about 1.5 mm to about 2.0 mm, from about 0.30 mm to about 1.9 mm, from about 0.30 mm to about 1.8 mm, from about 0.30 mm to about 1.7 mm, from about 0.30 mm to about 1.6 mm, from about 0.30 mm to about 1.5 mm, from about 0.30 mm to about 1.4 mm, from about 0.30 mm to about 1.4 mm, from about 0.30 mm to about 1.3 mm, from about 0.30 mm to about 1.2 mm, from about 0.30 mm to about 1.1 mm, from about 0.30 mm to about 1.0 mm, from about 0.30 mm to about 0.90 mm, from about 0.30 mm to about 0.80 mm, from about 0.30 mm to about 0.70 mm, from about 0.30 mm to about 0.60 mm, or from about 0.30 mm to about 0.40 mm. In other embodiments, the t falls within any one of the exact numerical ranges set forth in this paragraph.

In various embodiments, width W is in a range from 5 cm to 250 cm, from about 10 cm to about 250 cm, from about 15 cm to about 250 cm, from about 20 cm to about 250 cm, from about 25 cm to about 250 cm, from about 30 cm to about 250 cm, from about 35 cm to about 250 cm, from about 40 cm to about 250 cm, from about 45 cm to about 250 cm, from about 50 cm to about 250 cm, from about 55 cm to about 250 cm, from about 60 cm to about 250 cm, from about 65 cm to about 250 cm, from about 70 cm to about 250 cm, from about 75 cm to about 250 cm, from about 80 cm to about 250 cm, from about 85 cm to about 250 cm, from about 90 cm to about 250 cm, from about 95 cm to about 250 cm, from about 100 cm to about 250 cm, from about 110 cm to about 250 cm, from about 120 cm to about 250 cm, from about 130 cm to about 250 cm, from about 140 cm to about 250 cm, from about 150 cm to about 250 cm, from about 5 cm to about 240 cm, from about 5 cm to about 230 cm, from about 5 cm to about 220 cm, from about 5 cm to about 210 cm, from about 5 cm to about 200 cm, from about 5 cm to about 190 cm, from about 5 cm to about 180 cm, from about 5 cm to about 170 cm, from about 5 cm to about 160 cm, from about 5 cm to about 150 cm, from about 5 cm to about 140 cm, from about 5 cm to about 130 cm, from about 5 cm to about 120 cm, from about 5 cm to about 110 cm, from about 5 cm to about 110 cm, from about 5 cm to about 100 cm, from about 5 cm to about 90 cm, from about 5 cm to about 80 cm, or from about 5 cm to about 75 cm. In other embodiments, W falls within any one of the exact numerical ranges set forth in this paragraph.

In various embodiments, length L is in a range from about 5 cm to about 2500 cm, from about 5 cm to about 2000 cm, from about 4 to about 1500 cm, from about 50 cm to about 1500 cm, from about 100 cm to about 1500 cm, from about 150 cm to about 1500 cm, from about 200 cm to about 1500 cm, from about 250 cm to about 1500 cm, from about 300 cm to about 1500 cm, from about 350 cm to about 1500 cm, from about 400 cm to about 1500 cm, from about 450 cm to about 1500 cm, from about 500 cm to about 1500 cm, from about 550 cm to about 1500 cm, from about 600 cm to about 1500 cm, from about 650 cm to about 1500 cm, from about 650 cm to about 1500 cm, from about 700 cm to about 1500 cm, from about 750 cm to about 1500 cm, from about 800 cm to about 1500 cm, from about 850 cm to about 1500 cm, from about 900 cm to about 1500 cm, from about 950 cm to about 1500 cm, from about 1000 cm to about 1500 cm, from about 1050 cm to about 1500 cm, from about 1100 cm to about 1500 cm, from about 1150 cm to about 1500 cm, from about 1200 cm to about 1500 cm, from about 1250 cm to about 1500 cm, from about 1300 cm to about 1500 cm, from about 1350 cm to about 1500 cm, from about 1400 cm to about 1500 cm, or from about 1450 cm to about 1500 cm. In other embodiments, L falls within any one of the exact numerical ranges set forth in this paragraph.

In embodiments, the substrate 450, may be formed from any suitable glass composition comprising soda lime glass, aluminosilicate glass, borosilicate glass, boroaluminosilicate glass, alkali-containing aluminosilicate glass, alkali-containing borosilicate glass, and alkali-containing boroaluminosilicate glass.

Unless otherwise specified, the glass compositions disclosed herein are described in mole percent (mol %) as analyzed on an oxide basis.

In one or more embodiments, the glass composition may comprise $SiO_2$ in an amount in a range from about 66 mol % to about 80 mol %, from about 67 mol % to about 80 mol %, from about 68 mol % to about 80 mol %, from about 69 mol % to about 80 mol %, from about 70 mol % to about 80 mol %, from about 72 mol % to about 80 mol %, from about 65 mol % to about 78 mol %, from about 65 mol % to about 76 mol %, from about 65 mol % to about 75 mol %, from about 65 mol % to about 74 mol %, from about 65 mol % to about 72 mol %, or from about 65 mol % to about 70 mol %, and all ranges and sub-ranges therebetween.

In one or more embodiments, the glass composition comprises $Al_2O_3$ in an amount greater than about 4 mol %, or greater than about 5 mol %. In one or more embodiments, the glass composition comprises $Al_2O_3$ in a range from greater than about 7 mol % to about 15 mol %, from greater than about 7 mol % to about 14 mol %, from about 7 mol % to about 13 mol %, from about 4 mol % to about 12 mol %, from about 7 mol % to about 11 mol %, from about 8 mol % to about 15 mol %, from 9 mol % to about 15 mol %, from about 9 mol % to about 15 mol %, from about 10 mol % to about 15 mol %, from about 11 mol % to about 15 mol %, or from about 12 mol % to about 15 mol %, and all ranges and sub-ranges therebetween. In one or more embodiments, the upper limit of $Al_2O_3$ may be about 14 mol %, 14.2 mol %, 14.4 mol %, 14.6 mol %, or 14.8 mol %.

In one or more embodiments, glass layer(s) herein are described as an aluminosilicate glass article or comprising an aluminosilicate glass composition. In such embodiments, the glass composition or article formed therefrom comprises $SiO_2$ and $Al_2O_3$ and is not a soda lime silicate glass. In this regard, the glass composition or article formed therefrom comprises $Al_2O_3$ in an amount of about 2 mol % or greater, 2.25 mol % or greater, 2.5 mol % or greater, about 2.75 mol % or greater, about 3 mol % or greater.

In one or more embodiments, the glass composition comprises $B_2O_3$ (e.g., about 0.01 mol % or greater). In one or more embodiments, the glass composition comprises $B_2O_3$ in an amount in a range from about 0 mol % to about 5 mol %, from about 0 mol % to about 4 mol %, from about 0 mol % to about 3 mol %, from about 0 mol % to about 2 mol %, from about 0 mol % to about 1 mol %, from about 0 mol % to about 0.5 mol %, from about 0.1 mol % to about 5 mol %, from about 0.1 mol % to about 4 mol %, from about 0.1 mol % to about 3 mol %, from about 0.1 mol % to about 2 mol %, from about 0.1 mol % to about 1 mol %, from about 0.1 mol % to about 0.5 mol %, and all ranges and sub-ranges therebetween. In one or more embodiments, the glass composition is substantially free of $B_2O_3$.

As used herein, the phrase "substantially free" with respect to the components of the composition means that the component is not actively or intentionally added to the composition during initial batching, but may be present as an impurity in an amount less than about 0.001 mol %.

In one or more embodiments, the glass composition optionally comprises $P_2O_5$ (e.g., about 0.01 mol % or greater). In one or more embodiments, the glass composition comprises a non-zero amount of $P_2O_5$ up to and comprising 2 mol %, 1.5 mol %, 1 mol %, or 0.5 mol %. In one or more embodiments, the glass composition is substantially free of $P_2O_5$.

In one or more embodiments, the glass composition may comprise a total amount of $R_2O$ (which is the total amount of alkali metal oxide such as $Li_2O$, $Na_2O$, $K_2O$, $Rb_2O$, and $Cs_2O$) that is greater than or equal to about 8 mol %, greater than or equal to about 10 mol %, or greater than or equal to about 12 mol %. In some embodiments, the glass composition comprises a total amount of $R_2O$ in a range from about 8 mol % to about 20 mol %, from about 8 mol % to about 18 mol %, from about 8 mol % to about 16 mol %, from about 8 mol % to about 14 mol %, from about 8 mol % to about 12 mol %, from about 9 mol % to about 20 mol %, from about 10 mol % to about 20 mol %, from about 11 mol % to about 20 mol %, from about 12 mol % to about 20 mol %, from about 13 mol % to about 20 mol %, from about 10 mol % to about 14 mol %, or from 11 mol % to about 13 mol %, and all ranges and sub-ranges therebetween. In one or more embodiments, the glass composition may be substantially free of $Rb_2O$, $Cs_2O$ or both $Rb_2O$ and $Cs_2O$. In one or more embodiments, the $R_2O$ may comprise the total amount of $Li_2O$, $Na_2O$ and $K_2O$ only. In one or more embodiments, the glass composition may comprise at least one alkali metal oxide selected from $Li_2O$, $Na_2O$ and $K_2O$, wherein the alkali metal oxide is present in an amount greater than about 8 mol % or greater.

In one or more embodiments, the glass composition comprises $Na_2O$ in an amount greater than or equal to about 8 mol %, greater than or equal to about 10 mol %, or greater than or equal to about 12 mol %. In one or more embodiments, the composition comprises $Na_2O$ in a range from about from about 8 mol % to about 20 mol %, from about 8 mol % to about 18 mol %, from about 8 mol % to about 16 mol %, from about 8 mol % to about 14 mol %, from about 8 mol % to about 12 mol %, from about 9 mol % to about 20 mol %, from about 10 mol % to about 20 mol %, from about 11 mol % to about 20 mol %, from about 12 mol % to about 20 mol %, from about 13 mol % to about 20 mol %, from about 10 mol % to about 14 mol %, or from 11 mol % to about 16 mol %, and all ranges and sub-ranges therebetween.

In one or more embodiments, the glass composition comprises less than about 4 mol % $K_2O$, less than about 3 mol % $K_2O$, or less than about 1 mol % $K_2O$. In some instances, the glass composition may comprise $K_2O$ in an amount in a range from about 0 mol % to about 4 mol %, from about 0 mol % to about 3.5 mol %, from about 0 mol % to about 3 mol %, from about 0 mol % to about 2.5 mol %, from about 0 mol % to about 2 mol %, from about 0 mol % to about 1.5 mol %, from about 0 mol % to about 1 mol %, from about 0 mol % to about 0.5 mol %, from about 0 mol % to about 0.2 mol %, from about 0 mol % to about 0.1 mol %, from about 0.5 mol % to about 4 mol %, from about 0.5 mol % to about 3.5 mol %, from about 0.5 mol % to about 3 mol %, from about 0.5 mol % to about 2.5 mol %, from about 0.5 mol % to about 2 mol %, from about 0.5 mol % to about 1.5 mol %, or from about 0.5 mol % to about 1 mol %, and all ranges and sub-ranges therebetween. In one or more embodiments, the glass composition may be substantially free of $K_2O$.

In one or more embodiments, the glass composition is substantially free of $Li_2O$.

In one or more embodiments, the amount of $Na_2O$ in the composition may be greater than the amount of $Li_2O$. In some instances, the amount of $Na_2O$ may be greater than the combined amount of $Li_2O$ and $K_2O$. In one or more alternative embodiments, the amount of $Li_2O$ in the composition may be greater than the amount of $Na_2O$ or the combined amount of $Na_2O$ and $K_2O$.

In one or more embodiments, the glass composition may comprise a total amount of RO (which is the total amount of alkaline earth metal oxide such as CaO, MgO, BaO, ZnO and SrO) in a range from about 0 mol % to about 2 mol %. In some embodiments, the glass composition comprises a non-zero amount of RO up to about 2 mol %. In one or more embodiments, the glass composition comprises RO in an amount from about 0 mol % to about 1.8 mol %, from about 0 mol % to about 1.6 mol %, from about 0 mol % to about 1.5 mol %, from about 0 mol % to about 1.4 mol %, from about 0 mol % to about 1.2 mol %, from about 0 mol % to about 1 mol %, from about 0 mol % to about 0.8 mol %, from about 0 mol % to about 0.5 mol %, and all ranges and sub-ranges therebetween.

In one or more embodiments, the glass composition comprises CaO in an amount less than about 1 mol %, less than about 0.8 mol %, or less than about 0.5 mol %. In one or more embodiments, the glass composition is substantially free of CaO. In some embodiments, the glass composition comprises MgO in an amount from about 0 mol % to about 7 mol %, from about 0 mol % to about 6 mol %, from about 0 mol % to about 5 mol %, from about 0 mol % to about 4 mol %, from about 0.1 mol % to about 7 mol %, from about 0.1 mol % to about 6 mol %, from about 0.1 mol % to about 5 mol %, from about 0.1 mol % to about 4 mol %, from about 1 mol % to about 7 mol %, from about 2 mol % to about 6 mol %, or from about 3 mol % to about 6 mol %, and all ranges and sub-ranges therebetween.

In one or more embodiments, the glass composition comprises $ZrO_2$ in an amount equal to or less than about 0.2 mol %, less than about 0.18 mol %, less than about 0.16 mol %, less than about 0.15 mol %, less than about 0.14 mol %, less than about 0.12 mol %. In one or more embodiments, the glass composition comprises $ZrO_2$ in a range from about 0.01 mol % to about 0.2 mol %, from about 0.01 mol % to about 0.18 mol %, from about 0.01 mol % to about 0.16 mol %, from about 0.01 mol % to about 0.15 mol %, from about 0.01 mol % to about 0.14 mol %, from about 0.01 mol % to about 0.12 mol %, or from about 0.01 mol % to about 0.10 mol %, and all ranges and sub-ranges therebetween.

In one or more embodiments, the glass composition comprises $SnO_2$ in an amount equal to or less than about 0.2 mol %, less than about 0.18 mol %, less than about 0.16 mol %, less than about 0.15 mol %, less than about 0.14 mol %, less than about 0.12 mol %. In one or more embodiments, the glass composition comprises SnO2 in a range from about 0.01 mol % to about 0.2 mol %, from about 0.01 mol % to about 0.18 mol %, from about 0.01 mol % to about 0.16 mol %, from about 0.01 mol % to about 0.15 mol %, from about 0.01 mol % to about 0.14 mol %, from about 0.01 mol % to about 0.12 mol %, or from about 0.01 mol % to about 0.10 mol %, and all ranges and sub-ranges therebetween.

In one or more embodiments, the glass composition may comprise an oxide that imparts a color or tint to the glass articles. In some embodiments, the glass composition comprises an oxide that prevents discoloration of the glass article when the glass article is exposed to ultraviolet radiation. Examples of such oxides comprise, without limitation oxides of: Ti, V, Cr, Mn, Fe, Co, Ni, Cu, Ce, W, and Mo.

In one or more embodiments, the glass composition comprises Fe expressed as $Fe_2O_3$, wherein Fe is present in an amount up to (and comprising) about 1 mol %. In some embodiments, the glass composition is substantially free of Fe. In one or more embodiments, the glass composition comprises $Fe_2O_3$ in an amount equal to or less than about 0.2 mol %, less than about 0.18 mol %, less than about 0.16 mol %, less than about 0.15 mol %, less than about 0.14 mol %, less than about 0.12 mol %. In one or more embodiments, the glass composition comprises $Fe_2O_3$ in a range from about 0.01 mol % to about 0.2 mol %, from about 0.01 mol % to about 0.18 mol %, from about 0.01 mol % to about 0.16 mol %, from about 0.01 mol % to about 0.15 mol %, from about 0.01 mol % to about 0.14 mol %, from about 0.01 mol % to about 0.12 mol %, or from about 0.01 mol % to about 0.10 mol %, and all ranges and sub-ranges therebetween.

Where the glass composition comprises $TiO_2$, $TiO_2$ may be present in an amount of about 5 mol % or less, about 2.5 mol % or less, about 2 mol % or less or about 1 mol % or less. In one or more embodiments, the glass composition may be substantially free of $TiO_2$.

An exemplary glass composition comprises $SiO_2$ in an amount in a range from about 65 mol % to about 75 mol %, $Al_2O_3$ in an amount in a range from about 8 mol % to about 14 mol %, $Na_2O$ in an amount in a range from about 12 mol % to about 17 mol %, $K_2O$ in an amount in a range of about 0 mol % to about 0.2 mol %, and MgO in an amount in a range from about 1.5 mol % to about 6 mol %. Optionally, SnO$_2$ may be comprised in the amounts otherwise disclosed herein.

Strengthened Glass Properties

In one or more embodiments, the substrate 450 discussed herein may be formed from a strengthened glass sheet or article. In one or more embodiments, the glass articles used to form the layer(s) of the decorated glass structures discussed herein may be strengthened to comprise compressive stress that extends from a surface to a depth of compression (DOC). The compressive stress regions are balanced by a central portion exhibiting a tensile stress. At the DOC, the stress crosses from a positive (compressive) stress to a negative (tensile) stress.

In one or more embodiments, the glass articles used to form the layer(s) of the decorated glass structures discussed herein may be strengthened mechanically by utilizing a mismatch of the coefficient of thermal expansion between portions of the glass to create a compressive stress region and a central region exhibiting a tensile stress. In some embodiments, the glass article may be strengthened thermally by heating the glass to a temperature above the glass transition point and then rapidly quenching.

In one or more embodiments, the glass articles used to form the layer(s) of the decorated glass structures discussed herein may be chemically strengthening by ion exchange. In the ion exchange process, ions at or near the surface of the glass article are replaced by—or exchanged with—larger ions having the same valence or oxidation state. In those embodiments in which the glass article comprises an alkali aluminosilicate glass, ions in the surface layer of the article and the larger ions are monovalent alkali metal cations, such as Li+, Na+, K+, Rb+, and Cs+. Alternatively, monovalent cations in the surface layer may be replaced with monovalent cations other than alkali metal cations, such as Ag+ or the like. In such embodiments, the monovalent ions (or cations) exchanged into the glass article generate a stress.

Ion exchange processes are typically carried out by immersing a glass article in a molten salt bath (or two or more molten salt baths) containing the larger ions to be exchanged with the smaller ions in the glass article. It should be noted that aqueous salt baths may also be utilized. In addition, the composition of the bath(s) may comprise more than one type of larger ion (e.g., Na+ and K+) or a single larger ion. It will be appreciated by those skilled in the art that parameters for the ion exchange process, comprising, but not limited to, bath composition and temperature, immersion time, the number of immersions of the glass article in a salt bath (or baths), use of multiple salt baths, additional steps such as annealing, washing, and the like, are generally determined by the composition of the glass layer(s) of a decorated glass structure (comprising the structure of the article and any crystalline phases present) and the desired DOC and CS of the glass layer(s) of a decorated glass structure that results from strengthening.

Exemplary molten bath composition may comprise nitrates, sulfates, and chlorides of the larger alkali metal ion. Typical nitrates comprise KNO$_3$, NaNO$_3$, LiNO$_3$, NaSO$_4$ and combinations thereof. The temperature of the molten salt bath typically is in a range from about 380° C. up to about 450° C., while immersion times range from about 15 minutes up to about 100 hours depending on the glass thickness, bath temperature and glass (or monovalent ion) diffusivity. However, temperatures and immersion times different from those described above may also be used.

In one or more embodiments, the glass articles used to form the layer(s) of the decorated glass may be immersed in a molten salt bath of 100% NaNO$_3$, 100% KNO$_3$, or a combination of NaNO$_3$ and KNO$_3$ having a temperature from about 370° C. to about 480° C. In some embodiments, the glass layer(s) of a decorated glass may be immersed in a molten mixed salt bath comprising from about 5% to about 90% KNO$_3$ and from about 10% to about 95% NaNO$_3$. In one or more embodiments, the glass article may be immersed in a second bath, after immersion in a first bath. The first and second baths may have different compositions and/or temperatures from one another. The immersion times in the first and second baths may vary. For example, immersion in the first bath may be longer than the immersion in the second bath.

In one or more embodiments, the glass articles used to form the layer(s) of the decorated glass structures may be immersed in a molten, mixed salt bath comprising NaNO$_3$ and KNO$_3$ (e.g., 49%/51%, 50%/50%, 51%/49%) having a temperature less than about 420° C. (e.g., about 400° C. or about 380° C.) for less than about 5 hours, or even about 4 hours or less.

Ion exchange conditions can be tailored to provide a "spike" or to increase the slope of the stress profile at or near the surface of the resulting glass layer(s) of a decorated glass structure. The spike may result in a greater surface CS value. This spike can be achieved by single bath or multiple baths, with the bath(s) having a single composition or mixed composition, due to the unique properties of the glass compositions used in the glass layer(s) of a decorated glass structure described herein.

In one or more embodiments, where more than one monovalent ion is exchanged into the glass articles used to form the layer(s) of the decorated glass structures, the different monovalent ions may exchange to different depths within the glass layer (and generate different magnitudes stresses within the glass article at different depths). The resulting relative depths of the stress-generating ions can be determined and cause different characteristics of the stress profile.

CS is measured using those means known in the art, such as by surface stress meter (FSM) using commercially available instruments such as the FSM-6000, manufactured by Orihara Industrial Co., Ltd. (Japan). Surface stress measurements rely upon the accurate measurement of the stress optical coefficient (SOC), which is related to the birefringence of the glass. SOC in turn is measured by those methods that are known in the art, such as fiber and four point bend methods, both of which are described in ASTM standard C770-98 (2013), entitled "Standard Test Method for Measurement of Glass Stress-Optical Coefficient," the contents of which are incorporated herein by reference in their entirety, and a bulk cylinder method. As used herein CS may be the "maximum compressive stress" which is the highest compressive stress value measured within the compressive stress layer. In some embodiments, the maximum compressive stress is located at the surface of the glass article. In other embodiments, the maximum compressive stress may occur at a depth below the surface, giving the compressive profile the appearance of a "buried peak."

DOC may be measured by FSM or by a scattered light polariscope (SCALP) (such as the SCALP-04 scattered light polariscope available from GlasStress Ltd., located in Tallinn Estonia), depending on the strengthening method and conditions. When the glass article is chemically strengthened by an ion exchange treatment, FSM or SCALP may be used depending on which ion is exchanged into the glass article. Where the stress in the glass article is generated by exchanging potassium ions into the glass article, FSM is used to measure DOC. Where the stress is generated by exchanging sodium ions into the glass article, SCALP is used to measure DOC. Where the stress in the glass article is generated by exchanging both potassium and sodium ions into the glass, the DOC is measured by SCALP, since it is believed the exchange depth of sodium indicates the DOC and the exchange depth of potassium ions indicates a change in the magnitude of the compressive stress (but not the change in stress from compressive to tensile); the exchange depth of potassium ions in such glass articles is measured by FSM. Central tension or CT is the maximum tensile stress and is measured by SCALP.

In one or more embodiments, the glass articles used to form the layer(s) of the decorated glass structures maybe strengthened to exhibit a DOC that is described a fraction of the thickness t of the glass article (as described herein). For example, in one or more embodiments, the DOC may be equal to or greater than about 0.05t, equal to or greater than about 0. It, equal to or greater than about 0.11t, equal to or greater than about 0.12t, equal to or greater than about 0.13t, equal to or greater than about 0.14t, equal to or greater than about 0.15t, equal to or greater than about 0.16t, equal to or greater than about 0.17t, equal to or greater than about 0.18t, equal to or greater than about 0.19t, equal to or greater than about 0.2t, equal to or greater than about 0.21t. In some embodiments, The DOC may be in a range from about 0.08t to about 0.25t, from about 0.09t to about 0.25t, from about 0.18t to about 0.25t, from about 0.11t to about 0.25t, from about 0.12t to about 0.25t, from about 0.13t to about 0.25t, from about 0.14t to about 0.25t, from about 0.15t to about 0.25t, from about 0.08t to about 0.24t, from about 0.08t to about 0.23t, from about 0.08t to about 0.22t, from about 0.08t to about 0.21t, from about 0.08t to about 0.2t, from about 0.08t to about 0.19t, from about 0.08t to about 0.18t, from about 0.08t to about 0.17t, from about 0.08t to about 0.16t, or from about 0.08t to about 0.15t. In some instances, the DOC may be about 20 μm or less. In one or more embodiments, the DOC may be about 40 μm or greater (e.g., from about 40 μm to about 300 μm, from about 50 μm to about 300 μm, from about 60 μm to about 300 μm, from about 70 μm to about 300 μm, from about 80 μm to about 300 μm, from about 90 μm to about 300 μm, from about 100 μm to about 300 μm, from about 110 μm to about 300 μm, from about 120 μm to about 300 μm, from about 140 μm to about 300 μm, from about 150 μm to about 300 μm, from about 40 μm to about 290 μm, from about 40 μm to about 280 μm, from about 40 μm to about 260 μm, from about 40 μm to about 250 μm, from about 40 μm to about 240 μm, from about 40 μm to about 230 μm, from about 40 μm to about 220 μm, from about 40 μm to about 210 μm, from about 40 μm to about 200 μm, from about 40 μm to about 180 μm, from about 40 μm to about 160 μm, from about 40 μm to about 150 μm, from about 40 μm to about 140 μm, from about 40 μm to about 130 μm, from about 40 μm to about 120 μm, from about 40 μm to about 110 μm, or from about 40 μm to about 100 μm.

In one or more embodiments, the glass articles used to form the layer(s) of the decorated glass structures may have a CS (which may be found at the surface or a depth within the glass article) of about 200 MPa or greater, 300 MPa or greater, 400 MPa or greater, about 500 MPa or greater, about 600 MPa or greater, about 700 MPa or greater, about 800 MPa or greater, about 900 MPa or greater, about 930 MPa or greater, about 1000 MPa or greater, or about 1050 MPa or greater.

In one or more embodiments, the glass articles used to form the layer(s) of the decorated glass structures may have a maximum tensile stress or central tension (CT) of about 20 MPa or greater, about 30 MPa or greater, about 40 MPa or greater, about 45 MPa or greater, about 50 MPa or greater, about 60 MPa or greater, about 70 MPa or greater, about 75 MPa or greater, about 80 MPa or greater, or about 85 MPa or greater. In some embodiments, the maximum tensile stress or central tension (CT) may be in a range from about 40 MPa to about 100 MPa.

Unless otherwise expressly stated, it is in no way intended that any method set forth herein be construed as requiring that its steps be performed in a specific order. Accordingly, where a method claim does not actually recite an order to be followed by its steps or it is not otherwise specifically stated in the claims or descriptions that the steps are to be limited to a specific order, it is in no way intended that any particular order be inferred. In addition, as used herein, the article "a" is intended to comprise one or more than one component or element, and is not intended to be construed as meaning only one.

It will be apparent to those skilled in the art that various modifications and variations can be made without departing from the spirit or scope of the disclosed embodiments. Since modifications, combinations, sub-combinations and variations of the disclosed embodiments incorporating the spirit and substance of the embodiments may occur to persons skilled in the art, the disclosed embodiments should be construed to comprise everything within the scope of the appended claims and their equivalents.

What is claimed is:

1. A deadfront article comprising:
   a substrate comprising a first major surface and a second major surface opposite the first major surface; and
   a deadfront assembly disposed on the second major surface, the deadfront assembly comprising:
      a first ink layer disposed proximate the second major surface;
      an intermediate layer positioned such that the first ink layer is disposed between the intermediate layer and the second major surface; and
      a second ink layer positioned such that the intermediate layer is disposed between the second ink layer and the first ink layer, wherein:
         the intermediate layer exhibits an average reflectance of greater than or equal to 1.0% over a wavelength range from 400 nm to 700 nm for light initially incident on a surface of the intermediate layer most proximate to the substrate, and
         the first ink layer comprises a first plurality of regions,
         the second ink layer comprises a second plurality of regions,
         each region of the second plurality of regions is configured to suppress deviations of an appearance of an overlapping region of the first plurality of regions from a target optical appearance in transmission.

2. The deadfront article of claim 1, wherein each region of the second plurality of regions comprises tristimulus X, Y and Z values in accordance with the CIE 1931 color space that are computed as a ratio of target values to tristimulus X, Y and Z values of the overlapping region of the first plurality of regions, wherein the target values are each greater than or equal to 0.30 and less than or equal to 0.50.

3. The deadfront article of claim 1, wherein, when light from a D65 illuminant is transmitted through the deadfront article, the light exhibits a maximum L* value that is greater than or equal to 50 and less than or equal to 80.

4. The deadfront article of claim 3, wherein, when the light from the D65 illuminant is transmitted through the deadfront article, the light exhibits a maximum a* value that is greater than or equal to −5 and less than or equal to 5 and a maximum b* value that is greater than or equal to −5 and less than or equal to 5.

5. The deadfront article of claim 3, wherein, when the light from the D65 illuminant is transmitted through the deadfront article, the light exhibits a maximum ΔE value, computed using the CIE76 formula and between two different positions on the deadfront article, that is less than or equal to 5.0.

6. The deadfront article of claim 5, wherein the maximum ΔE value is less than or equal to 2.0.

7. The deadfront article of claim 1, wherein each overlaping pair of regions comprising one of the first plurality of regions and one of the second plurality of regions exhibits a tristimulus Y value that is greater than or equal to 0.3 and less than or equal to 0.5 when light from a light source is transmitted through the deadfront assembly.

8. The deadfront article of claim 1, wherein the intermediate layer comprises a refractive index of greater than or equal to 1.8 or less than or equal to 1.2.

9. The deadfront article of claim 1, wherein the intermediate layer comprises at least one of a transparent ink, a white ink or a gray ink.

10. The deadfront article of claim 1, wherein the intermediate layer comprises a metallic layer.

11. The deadfront article of claim 1, wherein:
the intermediate layer comprises an air gap between the first ink layer and the second ink layer, and
the second ink layer is disposed on a surface of a second substrate held in fixed relation to the substrate.

12. The deadfront article of claim 1, wherein:
the intermediate layer comprises an index of refraction of greater than or equal to 1.8 and comprises at least one of $Nb_2O_5$, $Nb_2O_5$, $Ta_2O_5$, $ZrO_2$, $HfO_2$, $Si_3N_4$, SiON, $Y_2O_3$, $TiO_2$, and a transparent conductive oxide,
the first ink layer is disposed proximate to a first surface of the intermediate layer proximate the substrate, and
the second ink layer is disposed directly on a second surface of the intermediate layer.

13. The deadfront article of claim 1, wherein:
the intermediate layer comprises a multilayer stack comprising alternating layers of one or more higher index materials and one or more lower index materials,
the multilayer stack comprises from 2 to 20 of the alternating layers,
the one or more lower index materials comprise a refractive index of less than 1.6 at 550 nm, and
the one or more higher index materials comprise a refractive index of greater than 1.6 at 550 nm.

14. The deadfront article of claim 1, wherein the intermediate layer comprises an electrochromic layer configured to change between a first optical transmission state and a second optical transmission state where an average transmittance of the intermediate layer over the wavelength range is less than in the first optical transmission state.

15. The deadfront article of claim 1, wherein:
the intermediate layer comprises a second substrate and a reflector layer disposed on a surface of a second substrate proximate to one of the first ink layer and the second ink layer,
the first ink layer is disposed on a first side of the second substrate proximate to the substrate, and
the second ink layer is disposed on a second side of the second substrate.

16. A display assembly comprising:
a substrate comprising a first major surface and a second major surface opposite the first major surface; and
a deadfront assembly disposed on the second major surface, the deadfront assembly comprising:
a first ink layer disposed proximate the second major surface;
an intermediate layer positioned such that the first ink layer is disposed between the intermediate layer and the second major surface; and
a second ink layer positioned such that the intermediate layer is deposed between the second ink layer and the first ink layer, and
a light source coupled to the substrate such that the deadfront assembly is disposed between the light source and the substrate, wherein:
the light source is configured to emit light having an illumination spectrum over a wavelength range from 400 nm to 700 nm that is initially incident on the second ink layer prior to being transmitted through the intermediate layer, first ink layer, and substrate,
the intermediate layer exhibits an average reflectance of greater than or equal to 1.0% over the wavelength range for light initially incident on a surface of the intermediate layer most proximate to the substrate,
the first ink layer comprises a first plurality of regions,
the second ink layer comprises a second plurality of regions,
each region of the second plurality of regions is configured to suppress deviations of an appearance of an overlapping region of the first plurality of regions from a target optical appearance such that, when the light source emits light at a white point of the light source, the deadfront article exhibits an L* value in transmission that is greater than or equal to 50 and less than or equal to 80, an a* value that is greater than or equal to −5.0 and less than or equal to 5.0, and a b*value that is greater than or equal to −5.0 and less than or equal to 5.0.

17. The display assembly of claim 16, wherein the light source comprises a display laminated to the substrate, wherein the display comprises one of a liquid crystal display, an organic light emitting diode display, a μLED display, a quantum dot display, and a laser-based display.

18. The display assembly of claim 16, wherein when the light source emits light at a white point of the light source, the deadfront article exhibits a first maximum ΔE value, computed using the CIE76 formula and between two different positions on the deadfront article, that is less than or equal to 5.0.

19. The display assembly of claim 18, wherein the first maximum ΔE value is less than or equal to 2.0.

20. The display assembly of claim 16, wherein each region of the second plurality of regions comprises tristimulus X, Y and Z values in accordance with the CIE 1931 color space that are computed as a ratio of target values to tristimulus X, Y and Z values of the overlapping region of the first plurality of regions, wherein the target values are each greater than or equal to 0.30 and less than or equal to 0.50.

* * * * *